United States Patent
Kaushik et al.

(10) Patent No.: US 10,496,296 B2
(45) Date of Patent: *Dec. 3, 2019

(54) LOW OVERHEAD RESYNCHRONIZATION SNAPSHOT CREATION AND UTILIZATION

(71) Applicant: NetApp Inc., Sunnyvale, CA (US)

(72) Inventors: Akhil Kaushik, San Jose, CA (US); Ripulkumar Hemantbhai Patel, Fremont, CA (US); Vrishali Dattatray Hajare, Milpitas, CA (US); Andrew Eric Dunn, Sunnyvale, CA (US); Rithin Kumar Shetty, Sunnyvale, CA (US)

(73) Assignee: NetApp Inc., Sunnyvale, CA (US)

( * ) Notice: Subject to any disclaimer, the term of this patent is extended or adjusted under 35 U.S.C. 154(b) by 130 days.

This patent is subject to a terminal disclaimer.

(21) Appl. No.: 15/671,037

(22) Filed: Aug. 7, 2017

(65) Prior Publication Data
US 2017/0336997 A1    Nov. 23, 2017

Related U.S. Application Data

(63) Continuation of application No. 14/980,345, filed on Dec. 28, 2015, now Pat. No. 9,727,262.

(51) Int. Cl.
*G06F 11/14* (2006.01)
*G06F 3/06* (2006.01)
*G06F 11/20* (2006.01)

(52) U.S. Cl.
CPC ............ *G06F 3/0619* (2013.01); *G06F 3/065* (2013.01); *G06F 3/0683* (2013.01);
(Continued)

(58) Field of Classification Search
CPC ............ G06F 11/2076; G06F 11/2082; G06F 11/2071; G06F 11/2069; G06F 11/2064; G06F 3/065; G06F 3/0619; G06F 3/0683
See application file for complete search history.

(56) References Cited

U.S. PATENT DOCUMENTS 7,536,444 B2 *  5/2009  Kawamura  .........  G06F 11/2064
                                                            709/212
8,818,954 B1     8/2014  Bergant et al.
(Continued)

OTHER PUBLICATIONS

Notice of Allowance cited in U.S. Appl. No. 14/980,345 dated Apr. 2, 2017, 9 pgs.
(Continued)

*Primary Examiner* — Nadeem Iqbal
(74) *Attorney, Agent, or Firm* — Cooper Legal Group, LLC

(57) ABSTRACT

One or more techniques and/or computing devices are provided for resynchronization. For example, a request may be received to create pseudo snapshots of a first consistency group, hosted by a first storage controller, and a second consistency group, hosted by a second storage controller, having a synchronous replication relationship with the first consistency group. Incoming client write requests are logged within an intercept tracking log at the first storage controller. After a first drain without hold of incoming write requests is performed, a first pseudo common snapshot of the second consistency group is created. After a second drain without hold of incoming write operations is performed, a second pseudo common snapshot of the first consistency group and the intercept tracking log is created. The pseudo snapshots and the intercept tracking log (e.g., indicating a delta between the pseudo snapshots) are used to resynchronize the first and second consistency groups.

20 Claims, 25 Drawing Sheets

(52) U.S. Cl.
CPC ...... *G06F 11/1451* (2013.01); *G06F 11/1469* (2013.01); *G06F 11/20* (2013.01); *G06F 2201/805* (2013.01); *G06F 2201/84* (2013.01)

(56) References Cited

U.S. PATENT DOCUMENTS

| | | |
|---|---|---|
| 8,850,145 B1 | 9/2014 | Haase et al. |
| 8,938,429 B1 | 1/2015 | Bergant et al. |
| 9,081,754 B1 | 7/2015 | Natanzon et al. |
| 9,087,112 B1 * | 7/2015 | Natanzon ............ G06F 11/1471 |
| 9,135,120 B1 * | 9/2015 | Natanzon ............ G06F 11/1456 |
| 9,305,009 B1 | 4/2016 | Bono et al. |
| 9,378,219 B1 | 6/2016 | Bono et al. |
| 9,405,481 B1 | 8/2016 | Cohen et al. |
| 9,727,262 B2 * | 8/2017 | Kaushik ............... G06F 11/1469 |
| 9,881,014 B1 * | 1/2018 | Bono .................... G06F 16/27 |
| 10,019,502 B2 * | 7/2018 | Shetty .................. G06F 3/065 |
| 2006/0069865 A1 | 3/2006 | Kawamura et al. |
| 2013/0054534 A1 | 2/2013 | Eguchi et al. |

OTHER PUBLICATIONS

Amendment after Notice of Allowance cited in U.S. Appl. No. 14/980,345 dated Jun. 20, 2017, 10 pgs.

\* cited by examiner

LOW OVERHEAD RESYNCHRONIZATION SNAPSHOT CREATION AND UTILIZATION

RELATED APPLICATIONS

This application claims priority to and is a continuation of U.S. application Ser. No. 14/980,345, filed on Dec. 28, 2015, now allowed, titled "LOW OVERHEAD RESYNCHRONIZATION SNAPSHOT CREATION AND UTILIZATION," which is incorporated herein by reference.

BACKGROUND

Many storage networks may implement data replication and/or other redundancy data access techniques for data loss protection and non-disruptive client access. For example, a first storage cluster may comprise a first storage controller configured to provide clients with primary access to data stored within a first storage device and/or other storage devices. A second storage cluster may comprise a second storage controller configured to provide clients with primary access to data stored within a second storage device and/or other storage devices. The first storage controller and the second storage controller may be configured according to a disaster recovery relationship, such that the second storage controller may provide failover access to replicated data that was replicated from the first storage device to a secondary storage device, owned by the first storage controller, but accessible to the second storage controller (e.g., a switchover operation may be performed where the second storage controller assumes ownership of the secondary storage device and/or other storage devices previously owned by the first storage controller so that the second storage controller may provide clients with failover access to replicated data within such storage devices).

In an example, the second storage cluster may be located at a remote site to the first storage cluster (e.g., storage clusters may be located in different buildings, cities, thousands of kilometers from one another, etc.). Thus, if a disaster occurs at a site of a storage cluster, then a surviving storage cluster may remain unaffected by the disaster (e.g., a power outage of a building hosting the first storage cluster may not affect a second building hosting the second storage cluster in a different city).

In an example, two storage controllers within a storage cluster may be configured according to a high availability configuration, such as where the two storage controllers are locally connected to one another and/or to the same storage devices. In this way, when a storage controller fails, then a high availability partner storage controller can quickly takeover for the failed storage controller due to the local connectivity. Thus, the high availability partner storage controller may provide clients with access to data previously accessible through the failed storage controller.

Various replication and synchronization techniques may be used to replicate data (e.g., client data), configuration data (e.g., a size of a volume, a name of a volume, etc.), and/or write caching data (e.g., cached write operations) between storage controllers and/or storage devices. In an example of synchronization, a synchronous replication relationship may be implemented between the first storage controller and the second storage controller, such that an incoming write operation to the first storage controller is locally implemented upon a first consistency group (e.g., one or more files, logical unit number (LUNs), LUNs spanning multiple volumes, or any other type of storage object) by the first storage controller and remotely implemented upon a second consistency group (e.g., maintained as a backup replication of the first consistency group) by the second storage controller before an acknowledgement is provided back to a client that sent the incoming write operation. In an example of replication, snapshots of the first consistency group may be used to replicate the first consistency group to the second consistency group. For example, a base snapshot of the first consistency group (e.g., a volume comprising the first consistency group) may be used to initially create the second consistency group. A current incremental snapshot of the first consistency group (e.g., the volume) may be used to replicate changes made to the first consistency group since the base snapshot or since a last incremental snapshot. Snapshots may also be periodically created and used to recover from operational failures or corruption. Unfortunately, snapshot creation may be disruptive to client access to the first consistency group (e.g., client write requests may be blocked during snapshot creation) and/or may be disruptive to the synchronous replication relationship (e.g., if client write operations are not blocked and are implemented upon the first consistency group while a snapshot of the second consistency group is being created, then data divergence between the first consistency group and the second consistency group can occur). For example, client write requests to the first consistency group may be rejected during snapshot creation, thus increasing latency and client data access disruption.

DETAILED DESCRIPTION

Figure 1:
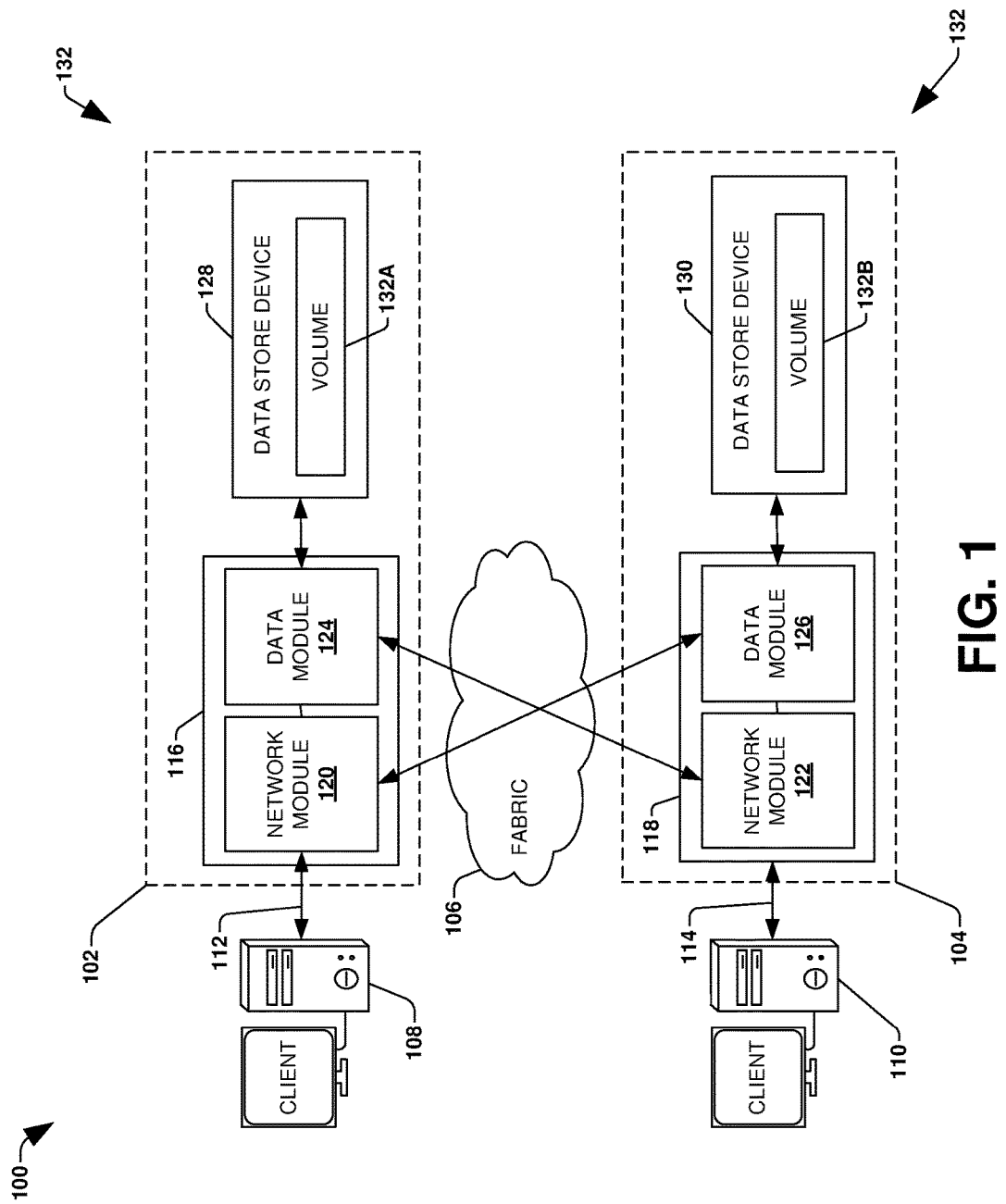
FIG. 1 is a component block diagram illustrating an example clustered network in accordance with one or more of the provisions set forth herein.

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

One or more techniques and/or computing devices for pseudo common snapshot creation and utilization are provided herein. For example, a synchronous replication relationship may exist between a first consistency group hosted by a first storage controller and a second consistency group hosted by a second storage controller (e.g., one or more files, LUNs, LUNs stored across multiple volumes, volumes, subdirectories, or any other storage objects may be synchronously replicated between the storage controllers, such that modifications to the first consistency group are replicated to the second consistency group before acknowledgements are provided back to clients requesting such modifications). A request to create pseudo common snapshots of the first consistency group and the second consistency group may be received. An intercept tracking log may be used to record data differences between a first pseudo command snapshot of the second consistency group and a subsequently created second pseudo common snapshot of the first consistency group. The pseudo common snapshots are created in a non-disruptive manner where incoming client write requests are not paused during snapshot creation and are still split and replicated between the first consistency group and the second consistency group. In this way, disruption of client data access to the first consistency group is reduced, and the synchronous replication relationship is maintained.

If the second storage controller falls behind (e.g., new client write operations are committed by the first storage controller but are not replicated to the second storage controller such as due to a network issue) and the synchronous replication relationship becomes out-of-sync, then the pseudo common snapshots may be used to perform a forward resynchronization to bring the second consistency group of the second storage controller in sync with the first consistency group. If the first storage controller falls behind due to a switchover operation and a subsequent switchback operation (e.g., the first storage controller may fail, and thus the second storage controller may perform a switchover operation to obtain ownership of storage devices previously owned by the first storage controller for providing clients with failover access to data within the storage devices, and then a switch back to the first storage controller for providing clients with primary access to the data may be performed after the first storage controller recovers) and the synchronous replication relationship becomes out-of-sync, then the pseudo common snapshots may be used to perform a reverse resynchronization. After the forward or reverse resynchronization is complete, other synchronization techniques (e.g., async replication using snapshots and incremental transfers) may be performed.

To provide context for pseudo common snapshot creation and utilization, FIG. 1 illustrates an embodiment of a clustered network environment 100 or a network storage environment. It may be appreciated, however, that the techniques, etc. described herein may be implemented within the clustered network environment 100, a non-cluster network environment, and/or a variety of other computing environments, such as a desktop computing environment. That is, the instant disclosure, including the scope of the appended claims, is not meant to be limited to the examples provided herein. It will be appreciated that where the same or similar components, elements, features, items, modules, etc. are illustrated in later figures but were previously discussed with regard to prior figures, that a similar (e.g., redundant) discussion of the same may be omitted when describing the subsequent figures (e.g., for purposes of simplicity and ease of understanding).

FIG. 1 is a block diagram illustrating the clustered network environment 100 that may implement at least some embodiments of the techniques and/or systems described herein. The clustered network environment 100 comprises data storage systems 102 and 104 that are coupled over a cluster fabric 106, such as a computing network embodied as a private Infiniband, Fibre Channel (FC), or Ethernet network facilitating communication between the data storage systems 102 and 104 (and one or more modules, component, etc. therein, such as, nodes 116 and 118, for example). It will be appreciated that while two data storage systems 102 and 104 and two nodes 116 and 118 are illustrated in FIG. 1, that any suitable number of such components is contemplated. In an example, nodes 116, 118 comprise storage controllers (e.g., node 116 may comprise a primary or local storage controller and node 118 may comprise a secondary or remote storage controller) that provide client devices, such as host devices 108, 110, with access to data stored within data storage devices 128, 130. Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner.

It will be further appreciated that clustered networks are not limited to any particular geographic areas and can be clustered locally and/or remotely. Thus, in one embodiment a clustered network can be distributed over a plurality of storage systems and/or nodes located in a plurality of geographic locations; while in another embodiment a clustered network can include data storage systems (e.g., 102, 104) residing in a same geographic location (e.g., in a single onsite rack of data storage devices).

In the illustrated example, one or more host devices 108, 110 which may comprise, for example, client devices, personal computers (PCs), computing devices used for storage (e.g., storage servers), and other computers or peripheral devices (e.g., printers), are coupled to the respective data storage systems 102, 104 by storage network connections 112, 114. Network connection may comprise a local area network (LAN) or wide area network (WAN), for example, that utilizes Network Attached Storage (NAS) protocols, such as a Common Internet File System (CIFS) protocol or a Network File System (NFS) protocol to exchange data packets. Illustratively, the host devices 108, 110 may be general-purpose computers running applications, and may interact with the data storage systems 102, 104 using a client/server model for exchange of information. That is, the host device may request data from the data storage system (e.g., data on a storage device managed by a network storage control configured to process I/O commands issued by the host device for the storage device), and the data storage system may return results of the request to the host device via one or more storage network connections 112, 114.

The nodes 116, 118 on clustered data storage systems 102, 104 can comprise network or host nodes that are interconnected as a cluster to provide data storage and management services, such as to an enterprise having remote locations, cloud storage (e.g., a storage endpoint may be stored within a data cloud), etc., for example. Such a node in the clustered network environment 100 can be a device attached to the network as a connection point, redistribution point or communication endpoint, for example. A node may be capable of sending, receiving, and/or forwarding information over a network communications channel, and could comprise any device that meets any or all of these criteria. One example of a node may be a data storage and management server attached to a network, where the server can comprise a general purpose computer or a computing device particularly configured to operate as a server in a data storage and management system.

In an example, a first cluster of nodes such as the nodes 116, 118 (e.g., a first set of storage controllers configured to provide access to a first storage aggregate comprising a first logical grouping of one or more storage devices) may be located on a first storage site. A second cluster of nodes, not illustrated, may be located at a second storage site (e.g., a second set of storage controllers configured to provide access to a second storage aggregate comprising a second logical grouping of one or more storage devices). The first cluster of nodes and the second cluster of nodes may be configured according to a disaster recovery configuration where a surviving cluster of nodes provides switchover access to storage devices of a disaster cluster of nodes in the event a disaster occurs at a disaster storage site comprising the disaster cluster of nodes (e.g., the first cluster of nodes provides client devices with switchover data access to storage devices of the second storage aggregate in the event a disaster occurs at the second storage site).

As illustrated in the clustered network environment 100, nodes 116, 118 can comprise various functional components that coordinate to provide distributed storage architecture for the cluster. For example, the nodes can comprise network modules 120, 122 and data modules 124, 126. Network moduless 120, 122 can be configured to allow the nodes 116, 118 (e.g., network storage controllers) to connect with host devices 108, 110 over the storage network connections 112, 114, for example, allowing the host devices 108, 110 to access data stored in the distributed storage system. Further, the network modules 120, 122 can provide connections with one or more other components through the cluster fabric 106. For example, in FIG. 1, the network module 120 of node 116 can access a second data storage device 130 by sending a request through the data module 126 of a second node 118.

Data modules 124, 126 can be configured to connect one or more data storage devices 128, 130, such as disks or arrays of disks, flash memory, or some other form of data storage, to the nodes 116, 118. The nodes 116, 118 can be interconnected by the cluster fabric 106, for example, allowing respective nodes in the cluster to access data on data storage devices 128, 130 connected to different nodes in the cluster. Often, data modules 124, 126 communicate with the data storage devices 128, 130 according to a storage area network (SAN) protocol, such as Small Computer System Interface (SCSI) or Fiber Channel Protocol (FCP), for example. Thus, as seen from an operating system on nodes 116, 118, the data storage devices 128, 130 can appear as locally attached to the operating system. In this manner, different nodes 116, 118, etc. may access data blocks through the operating system, rather than expressly requesting abstract files.

It should be appreciated that, while the clustered network environment 100 illustrates an equal number of network and data modules, other embodiments may comprise a differing number of these modules. For example, there may be a plurality of network and data modules interconnected in a cluster that does not have a one-to-one correspondence between the network and data modules. That is, different nodes can have a different number of network and data modules, and the same node can have a different number of network modules than data modules.

Further, a host device 108, 110 can be networked with the nodes 116, 118 in the cluster, over the storage networking connections 112, 114. As an example, respective host devices 108, 110 that are networked to a cluster may request services (e.g., exchanging of information in the form of data packets) of nodes 116, 118 in the cluster, and the nodes 116, 118 can return results of the requested services to the host devices 108, 110. In one embodiment, the host devices 108, 110 can exchange information with the network modules 120, 122 residing in the nodes 116, 118 (e.g., network hosts) in the data storage systems 102, 104.

In one embodiment, the data storage devices 128, 130 comprise volumes 132, which is an implementation of storage of information onto disk drives or disk arrays or other storage (e.g., flash) as a file-system for data, for example. Volumes can span a portion of a disk, a collection of disks, or portions of disks, for example, and typically define an overall logical arrangement of file storage on disk space in the storage system. In one embodiment a volume can comprise stored data as one or more files that reside in a hierarchical directory structure within the volume.

Volumes are typically configured in formats that may be associated with particular storage systems, and respective volume formats typically comprise features that provide functionality to the volumes, such as providing an ability for volumes to form clusters. For example, where a first storage system may utilize a first format for their volumes, a second storage system may utilize a second format for their volumes.

In the clustered network environment 100, the host devices 108, 110 can utilize the data storage systems 102, 104 to store and retrieve data from the volumes 132. In this embodiment, for example, the host device 108 can send data packets to the network module 120 in the node 116 within data storage system 102. The node 116 can forward the data to the data storage device 128 using the data module 124, where the data storage device 128 comprises volume 132A. In this way, in this example, the host device can access the volume 132A, to store and/or retrieve data, using the data storage system 102 connected by the network connection 112. Further, in this embodiment, the host device 110 can exchange data with the network module 122 in the host 118 within the data storage system 104 (e.g., which may be remote from the data storage system 102). The host 118 can forward the data to the data storage device 130 using the data module 126, thereby accessing volume 132B associated with the data storage device 130.

It may be appreciated that pseudo common snapshot creation and utilization may be implemented within the clustered network environment 100. In an example, a synchronous replication relationship may be established between the volume 132A (e.g., a first consistency group of the volume 132A, such as a subset of the volume 132A comprising one or more files, LUNs, or other storage objects) of node 116 (e.g., a first storage controller) and the volume 132B (e.g., a second consistency group of the volume 132B, such as a subset of the volume 132B comprising one or more files, LUNs, or other storage objects) of the node 118 (e.g., a second storage controller). Pseudo common snapshots of the volume 132A and the volume 132B may be created in a non-disruptive manner where incoming client write requests are not paused during snapshot creation and are still split and replicated between the volume 132A and the volume 132B. It may be appreciated that snapshot creation and utilization may be implemented for and/or between any type of computing environment, and may be transferrable between physical devices (e.g., node 116, node 118, a desktop computer, a tablet, a laptop, a wearable device, a mobile device, a storage device, a server, etc.) and/or a cloud computing environment (e.g., remote to the clustered network environment 100).

Figure 2:
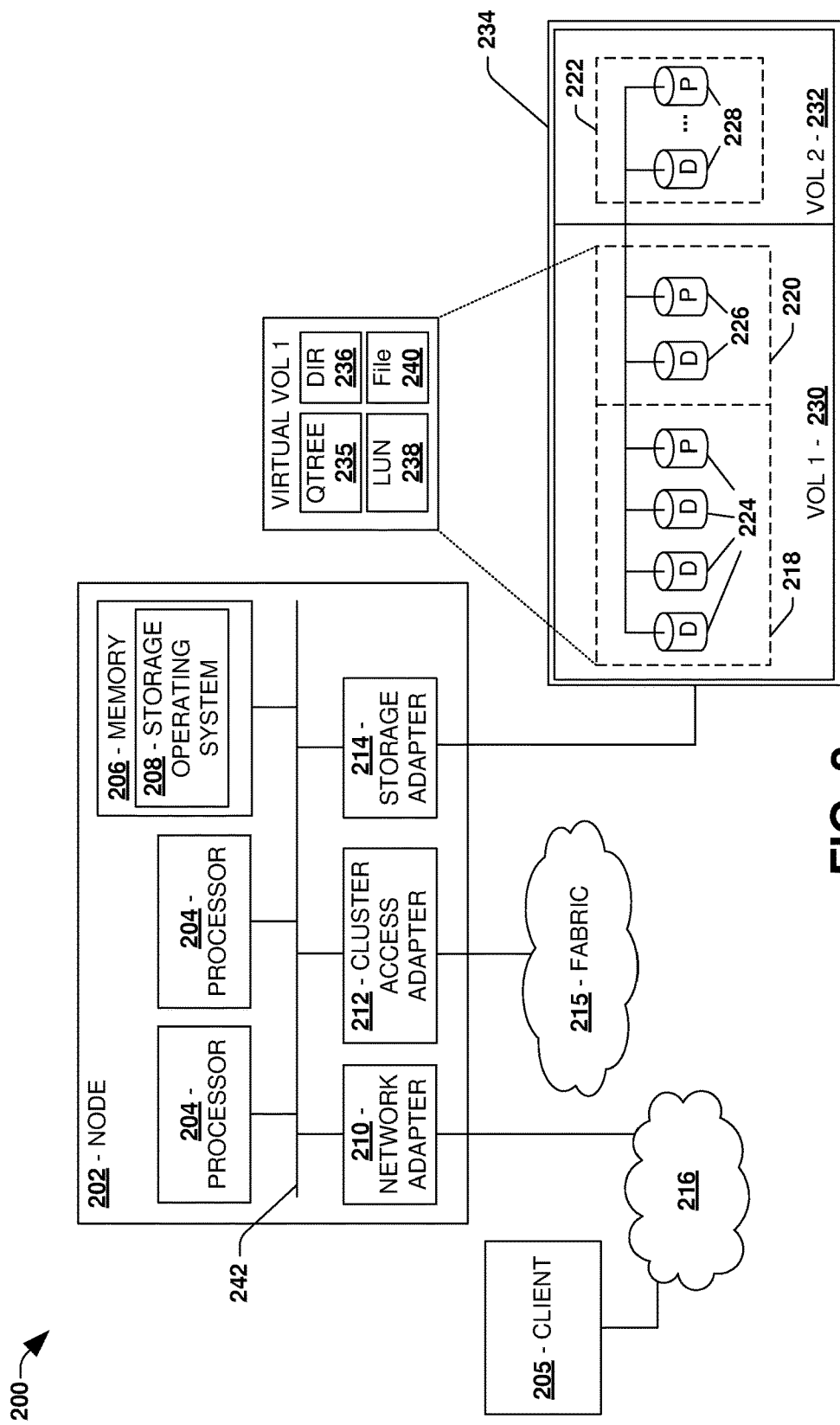
FIG. 2 is a component block diagram illustrating an example data storage system in accordance with one or more of the provisions set forth herein.

FIG. 2 is an illustrative example of a data storage system 200 (e.g., 102, 104 in FIG. 1), providing further detail of an embodiment of components that may implement one or more of the techniques and/or systems described herein. The data storage system 200 comprises a node 202 (e.g., host nodes 116, 118 in FIG. 1), and a data storage device 234 (e.g., data storage devices 128, 130 in FIG. 1). The node 202 may be a general purpose computer, for example, or some other computing device particularly configured to operate as a storage server. A host device 205 (e.g., 108, 110 in FIG. 1) can be connected to the node 202 over a network 216, for example, to provides access to files and/or other data stored on the data storage device 234. In an example, the node 202 comprises a storage controller that provides client devices, such as the host device 205, with access to data stored within data storage device 234.

The data storage device 234 can comprise mass storage devices, such as disks 224, 226, 228 of a disk array 218, 220, 222. It will be appreciated that the techniques and systems, described herein, are not limited by the example embodiment. For example, disks 224, 226, 228 may comprise any type of mass storage devices, including but not limited to magnetic disk drives, flash memory, and any other similar media adapted to store information, including, for example, data (D) and/or parity (P) information.

The node 202 comprises one or more processors 204, a memory 206, a network adapter 210, a cluster access adapter 212, and a storage adapter 214 interconnected by a system bus 242. The data storage system 200 also includes an operating system 208 installed in the memory 206 of the node 202 that can, for example, implement a Redundant Array of Independent (or Inexpensive) Disks (RAID) optimization technique to optimize a reconstruction process of data of a failed disk in an array.

The operating system 208 can also manage communications for the data storage system, and communications between other data storage systems that may be in a clustered network, such as attached to a cluster fabric 215 (e.g., 106 in FIG. 1). Thus, the node 202, such as a network storage controller, can respond to host device requests to manage data on the data storage device 234 (e.g., or additional clustered devices) in accordance with these host device requests. The operating system 208 can often establish one or more file systems on the data storage system 200, where a file system can include software code and data structures that implement a persistent hierarchical namespace of files and directories, for example. As an example, when a new data storage device (not shown) is added to a clustered network system, the operating system 208 is informed where, in an existing directory tree, new files associated with the new data storage device are to be stored. This is often referred to as "mounting" a file system.

In the example data storage system 200, memory 206 can include storage locations that are addressable by the processors 204 and network adapters 210, 212, 214 for storing related software application code and data structures. The processors 204 and network adapters 210, 212, 214 may, for example, include processing elements and/or logic circuitry configured to execute the software code and manipulate the data structures. The operating system 208, portions of which are typically resident in the memory 206 and executed by the processing elements, functionally organizes the storage system by, among other things, invoking storage operations in support of a file service implemented by the storage system. It will be apparent to those skilled in the art that other processing and memory mechanisms, including various computer readable media, may be used for storing and/or executing application instructions pertaining to the techniques described herein. For example, the operating system can also utilize one or more control files (not shown) to aid in the provisioning of virtual machines.

The network adapter 210 includes the mechanical, electrical and signaling circuitry needed to connect the data storage system 200 to a host device 205 over a network 216, which may comprise, among other things, a point-to-point connection or a shared medium, such as a local area network. The host device 205 (e.g., 108, 110 of FIG. 1) may be a general-purpose computer configured to execute applications. As described above, the host device 205 may interact with the data storage system 200 in accordance with a client/host model of information delivery.

The storage adapter 214 cooperates with the operating system 208 executing on the node 202 to access information requested by the host device 205 (e.g., access data on a storage device managed by a network storage controller). The information may be stored on any type of attached array of writeable media such as magnetic disk drives, flash memory, and/or any other similar media adapted to store information. In the example data storage system 200, the information can be stored in data blocks on the disks 224, 226, 228. The storage adapter 214 can include input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 214 and, if necessary, processed by the one or more processors 204 (or the storage adapter 214 itself) prior to being forwarded over the system bus 242 to the network adapter 210 (and/or the cluster access adapter 212 if sending to another node in the cluster) where the information is formatted into a data packet and returned to the host device 205 over the network 216 (and/or returned to another node attached to the cluster over the cluster fabric 215).

In one embodiment, storage of information on disk arrays 218, 220, 222 can be implemented as one or more storage volumes 230, 232 that are comprised of a cluster of disks 224, 226, 228 defining an overall logical arrangement of disk space. The disks 224, 226, 228 that comprise one or more volumes are typically organized as one or more groups of RAIDs. As an example, volume 230 comprises an aggregate of disk arrays 218 and 220, which comprise the cluster of disks 224 and 226.

In one embodiment, to facilitate access to disks 224, 226, 228, the operating system 208 may implement a file system (e.g., write anywhere file system) that logically organizes the information as a hierarchical structure of directories and files on the disks. In this embodiment, respective files may be implemented as a set of disk blocks configured to store information, whereas directories may be implemented as specially formatted files in which information about other files and directories are stored.

Whatever the underlying physical configuration within this data storage system 200, data can be stored as files within physical and/or virtual volumes, which can be associated with respective volume identifiers, such as file system identifiers (FSIDs), which can be 32-bits in length in one example.

A physical volume corresponds to at least a portion of physical storage devices whose address, addressable space, location, etc. doesn't change, such as at least some of one or more data storage devices 234 (e.g., a Redundant Array of Independent (or Inexpensive) Disks (RAID system)). Typically the location of the physical volume doesn't change in that the (range of) address(es) used to access it generally remains constant.

A virtual volume, in contrast, is stored over an aggregate of disparate portions of different physical storage devices. The virtual volume may be a collection of different available portions of different physical storage device locations, such as some available space from each of the disks 224, 226, and/or 228. It will be appreciated that since a virtual volume is not "tied" to any one particular storage device, a virtual volume can be said to include a layer of abstraction or virtualization, which allows it to be resized and/or flexible in some regards.

Further, a virtual volume can include one or more logical unit numbers (LUNs) 238, directories 236, Qtrees 235, and files 240. Among other things, these features, but more particularly LUNS, allow the disparate memory locations within which data is stored to be identified, for example, and grouped as data storage unit. As such, the LUNs 238 may be characterized as constituting a virtual disk or drive upon which data within the virtual volume is stored within the aggregate. For example, LUNs are often referred to as virtual drives, such that they emulate a hard drive from a general purpose computer, while they actually comprise data blocks stored in various parts of a volume.

In one embodiment, one or more data storage devices 234 can have one or more physical ports, wherein each physical port can be assigned a target address (e.g., SCSI target address). To represent respective volumes stored on a data storage device, a target address on the data storage device can be used to identify one or more LUNs 238. Thus, for example, when the node 202 connects to a volume 230, 232 through the storage adapter 214, a connection between the node 202 and the one or more LUNs 238 underlying the volume is created.

In one embodiment, respective target addresses can identify multiple LUNs, such that a target address can represent multiple volumes. The I/O interface, which can be implemented as circuitry and/or software in the storage adapter 214 or as executable code residing in memory 206 and executed by the processors 204, for example, can connect to volume 230 by using one or more addresses that identify the one or more LUNs 238.

It may be appreciated that pseudo common snapshot creation and utilization may be implemented for the data storage system 200. In an example, a synchronous replication relationship may be established between the volume 230 (e.g., a first consistency group of the volume 230, such as a subset of the volume 230 comprising one or more files, LUNs, or other storage objects) of the node 202 (e.g., a first storage controller) and a second volume (e.g., a second consistency group of the second volume, such as a subset of the second volume comprising one or more files, LUNs, or other storage objects) of a second node (e.g., a second storage controller). Pseudo common snapshots of the volume 230 and the second volume may be created in a non-disruptive manner where incoming client write request are not paused during snapshot creation and are still split and replicated between the volume 230 and the second volume. It may be appreciated that snapshot creation and utilization may be implemented for and/or between any type of computing environment, and may be transferrable between physical devices (e.g., node 202, host device 205, a desktop computer, a tablet, a laptop, a wearable device, a mobile device, a storage device, a server, etc.) and/or a cloud computing environment (e.g., remote to the node 202 and/or the host device 205).

Figure 3:
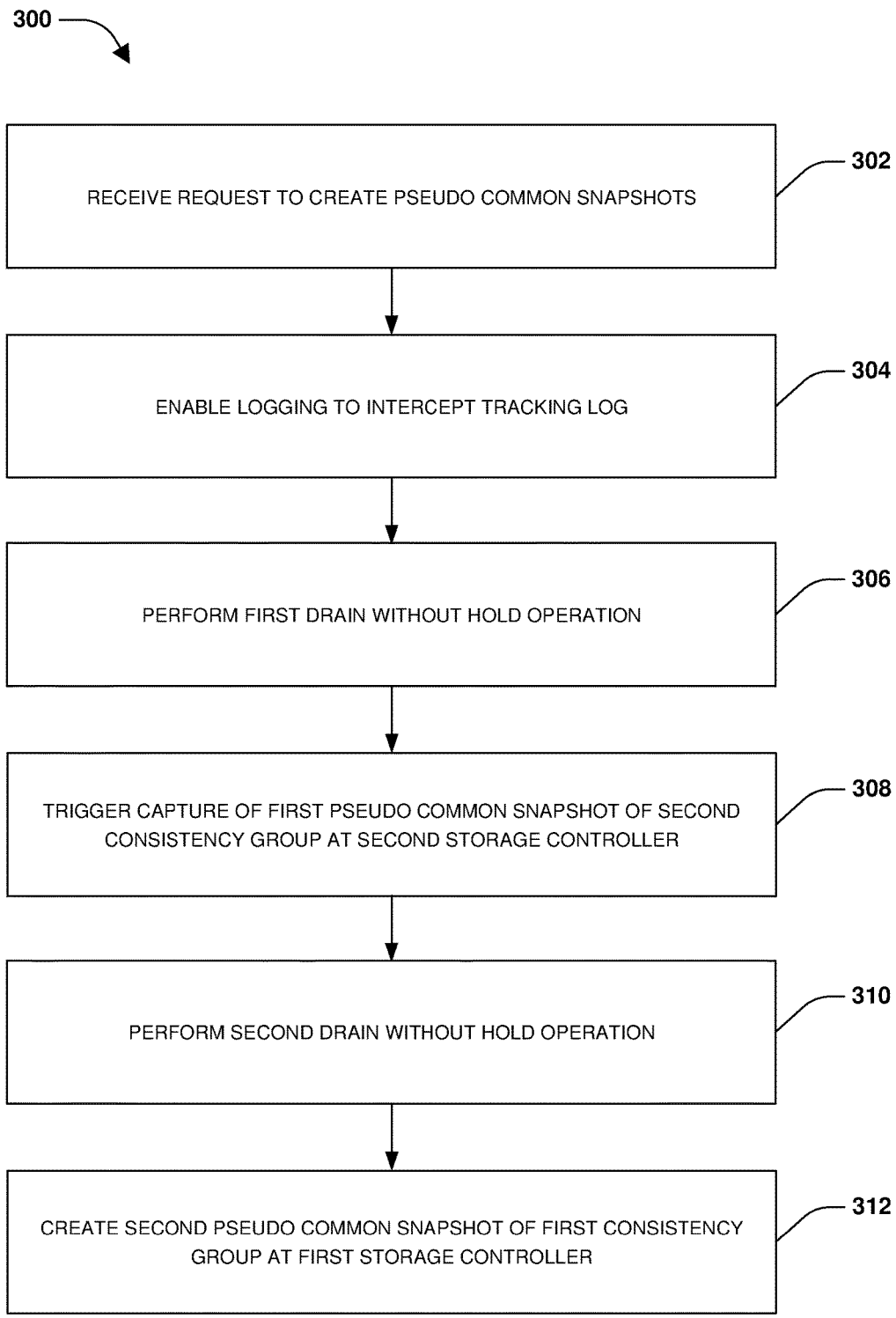
FIG. 3 is a flow chart illustrating an exemplary method of pseudo common snapshot creation and utilization.

One embodiment of pseudo common snapshot creation and utilization is illustrated by an exemplary method 300 of FIG. 3. In an example, a first storage controller may host a first consistency group, such as one or more files, one or more LUNs, one or more LUNs spanning across multiple volumes, a volume, a subdirectory within the volume, or any other type of object used to store data. A second storage controller may host a second consistency group that is a backup replication of the first consistency group. A synchronous replication relationship may be established between the first consistency group and the second consistency group, such that a modification to the first consistency group (e.g., a write operation from a client to a file) is replicated to the second consistency group before an acknowledgement is provided back to the client, thus preserving data consistency between the first consistency group and the second consistency group.

In an example of the synchronous replication relationship, a modification request (e.g., a write operation) that is received by a data module of the first storage controller is intercepted and checked to see if the modification request is to a file or LUN (e.g., the first consistency group) that is part of the synchronous replication relationship. If the modification request is to the file or LUN that is part of the synchronous replication relationship, then the modification request is intercepted and a first copy of the modification request is sent to a primary file system of the first storage controller for implementation, and a second copy of the modification request is sent to the second storage controller for implementation (e.g., implementation upon the second consistency group). Once the modification request is completed by both the first storage controller and the second storage controller, then the modification request is acknowledged back to a client that sent the modification request. If the modification request succeeds at the first storage controller but fails at the second storage controller, then the acknowledgment is sent to the client and the synchronous replication relationship is transitioned into an out-of-sync state. Synchronous replication may be provided for a consistency group of files and/or LUNs using multiple splitters, such that a single splitter is used to split modification requests to a particular file or LUN and the splitter tracks a status of ongoing modification requests. In an example, one or more splitters, for the first consistency group (e.g., a splitter per file or LUN or a single splitter for files and/or LUNs of the first consistency group), is configured to split write operations to target both the first consistency group and the second consistency group. For example, the splitter may receive a write operation targeting a first file or LUN of the first consistency group. The splitter may split the write operation into a replication write operation. The splitter may instruct the first storage controller to locally implement the write operation upon the first file or LUN and instruct the second storage controller to remotely implement the replication write operation upon a second file or LUN within the second consistency group.

At 302, a request to make pseudo common snapshots of the first consistency group may be received, such as by the first storage controller. At 304, the logging of incoming write requests to an intercept tracking log may be enabled at a first point in time (e.g., an epoch time may be change to a first epoch time). The intercept tracking log may comprise indicators that can be set to indicate whether portions of the first consistency group (e.g., a range of blocks or any other granularity of the first consistency group) have not been modified (e.g., a clean region comprising the same data as a corresponding portion of the second consistency group that is a backup replication of the clean region) or have been modified (e.g., a dirty region that has been modified by a client write request, and thus may potentially comprise different data than a corresponding region within the second consistency group that is a backup replication of the dirty region) with respect to the second consistency group. In an example, the intercept tracking log may comprise a bitmap, and the indicators may comprise bits. It may be appreciated that the intercept tracking log may comprise any other data structure or object configured to store data, such as a log. In an example, a single intercept tracking log may be used for the first consistency group or individual intercept tracking logs may be used for each file or LUN within the first consistency group. In an example, shared write functionality may be implemented. For example, the client write request and a log write to the intercept tracking log may be performed together. In this way, the implementation of client write requests and the logging on client write requests to the intercept tracking log may occur together as single operations.

The one or more splitters may continue to split incoming client write requests during logging. For example, an incoming client write request, targeting a portion of the first consistency group (e.g., a file, a LUN, an entirety of the first consistency group or merely a subset of the first consistency group, etc.), may be received. The incoming client write request may be split to create a replicated client write request based upon the synchronous replication relationship. The first storage controller may be instructed to locally implement the incoming client write request upon the portion of the first consistency group. Accordingly, the incoming client write request may be logged into the intercept tracking log to indicate that the portion of the first consistency group has been modified (e.g., that the portion is a dirty portion that may potentially comprise data that differs from data within a corresponding portion the second consistency group). The second storage controller may be instructed to remotely implement the replicated client write request upon the corresponding portion of the second consistency group. Responsive to the incoming client write request being logged, the incoming client write request successfully updating the portion of the first consistency group, and/or the replication incoming client write request successfully updating the corresponding portion of the second consistency group, the incoming client write request may be acknowledge (e.g., acknowledged as complete back to a client that sent the incoming client write request).

At 306, a first drain without hold operation may be performed to drain inflight client write requests occurring before the first point in time (e.g., occurring before the first epoch time). New inflight client write requests occurring after the first point in time are not held and drained, but may be normally processed. At 308, a capture of a first pseudo common snapshot of the second consistency group at the second storage controller may be triggered without pausing incoming client write requests. New incoming client write requests are not paused because differences caused by committing the new incoming client write requests may be captured within the intercept tracking log, and thus client data access to the first consistency group is not interrupted by the creation of the first pseudo common snapshot.

At 310, a second drain without hold operation may be performed to drain inflight client write requests occurring before the creation of the first pseudo common snapshot. For example, the first epoch time may be changed to a second epoch time, and inflight write requests occurring before the second epoch time may be drained (e.g., completed). While the second drain without hold operation is being performed, new incoming client write requests, occurring after the second epoch time, are parallel split and implemented as normal. In this way, inflight write requests that are completed by the second storage controller but not yet completed by the first storage controller due to parallel splitting may be completed by the first storage controller and captured within the intercept tracking log when a snapshot operation is performed by the first storage controller.

At 312, a second pseudo common snapshot of the first consistency group may be created at the first storage controller without pausing incoming client write requests. Not pausing incoming client write requests may reduce client data access disruption to the first consistency group that would otherwise occur if incoming client write requests were held. The second pseudo common snapshot may capture the intercept tracking log at a state that is indicative of a delta between the first pseudo common snapshot and the second pseudo common snapshot. The delta may correspond to potential data differences between the first consistency group and the second consistency group (e.g., data differences resulting from incoming client write requests being performed between when the first pseudo common snapshot and the second pseudo common snapshot were created). That is, the intercept tracking log captures a delta that is a superset of the potential differences.

Responsive to creating the first pseudo common snapshot and the second pseudo common snapshot, the logging of incoming client write requests may be stopped. Once the logging has stopped, a third drain without hold operation may be performed to drain inflight client write operations so that when the intercept tracking log is deleted, there are no inflight client write operations attempting to write to the deleted intercept tracking log, which may cause errors. In this way, the intercept tracking log may be deleted after the third drain without hold operation is complete.

The first and second pseudo common snapshots may be used to perform a forward resync in the event the second storage controller falls behind the first storage controller such as in terms of comprising up-to-date data (e.g., incoming client write request are completed by the first storage controller, are but not replicated to the second storage controller, such as due to a network issue). For example, the synchronous replication relationship may be determined as having transitioned into an out-of-sync state (e.g., the first consistency group comprises more up-to-date data). A local rollback base snapshot may be created. The local rollback base snapshot may be used to preserve an active file system of the second storage controller, such as in the event a roll back needs to be performed (e.g., to roll back from an error occurring during the forward resync).

The active file system of the second storage controller may be rolled back based upon differences between the local rollback base snapshot and the first pseudo common snapshot (e.g., content of the snapshots may be diffed, and the difference may be applied to the active file system). In this way, the active file system of the second storage controller is rolled back from the local rollback base snapshot to the first pseudo common snapshot. Data differences, identified within the intercept tracking log captured within the second pseudo common snapshot, are applied to the second consistency group of the rolled back active file system of the second storage controller until the second consistency group mirrors the first consistency group as reflected by the second pseudo common snapshot (e.g., dirty data is transferred from the second pseudo common snapshot at the first storage controller to the second storage controller for application to the active file system). For example, the intercept tracking log, captured within the second pseudo common snapshot, is evaluated to identify a delta (e.g., a dirty region). Dirty data of the delta is transferred from the first storage controller to the second storage controller to apply to the second consistency group. In this way, the active file system of the second storage controller reflects the second pseudo common snapshot.

In an example, a common snapshot of the second consistency group may be created after the data differences are applied. A resynchronization (e.g., an async engine that utilizes incremental asynchronous replication and snapshots to transfer data differences from the first storage controller to the second storage controller) may be performed between the first consistency group and the second consistency group using the common snapshot and/or one or more incremental snapshots and transfers. In this way, the synchronous replication relationship may be restored and the first and second consistency groups may be data consistent.

The first and second pseudo common snapshots may be used to perform a reverse resync in the event the first storage controller falls behind the second storage controller such as in terms of comprising up-to-date data (e.g., the first storage controller may fail, and thus the second storage controller may perform a switchover operation to provide clients with failover access to replicated data such as access to the second consistency group, and thus the second storage controller has more up-to-date data). A determination may be made that a switchback operation can be performed to give control back from the second storage controller to the first storage controller to provide clients with primary access to data. The switchback operation may be performed, such as after resynchronization, in response to the first storage controller recovering from a failure where the second storage controller performed a switchover operation to provide clients with failover access to the data previously accessible through the first storage controller.

A local rollback base snapshot may be created. The local rollback base snapshot may be used to preserve an active file system of the first storage controller, such as in the event a roll back needs to be performed (e.g., to roll back from an error occurring during the forward resync). The active file system of the first storage controller is rolled back based upon the second pseudo common snapshot. The first consistency group is restored based upon the first pseudo common snapshot until the first consistency group mirrors the second consistency group as reflected by the first pseudo common snapshot (e.g., a data transfer is performed from the second storage controller to the first storage controller to restore the first storage controller back to the first pseudo common snapshot). For example, the first storage controller is queried by the second storage controller to identify data differences recorded within the intercept tracking log maintained by the first storage controller. The data differences are sent to the first storage controller for overwriting corresponding portions within the first consistency group. In this way, new data may be transferred from the second storage controller to the first storage controller.

In an example, a common snapshot of the second consistency group may be created after the data differences are applied. A resynchronization may be performed between the first consistency group and the second consistency group using the common snapshot and/or one or more incremental snapshots and transfers. In this way, the synchronous replication relationship may be restored and the first and second consistency groups may be data consistent.

Figure 4A:
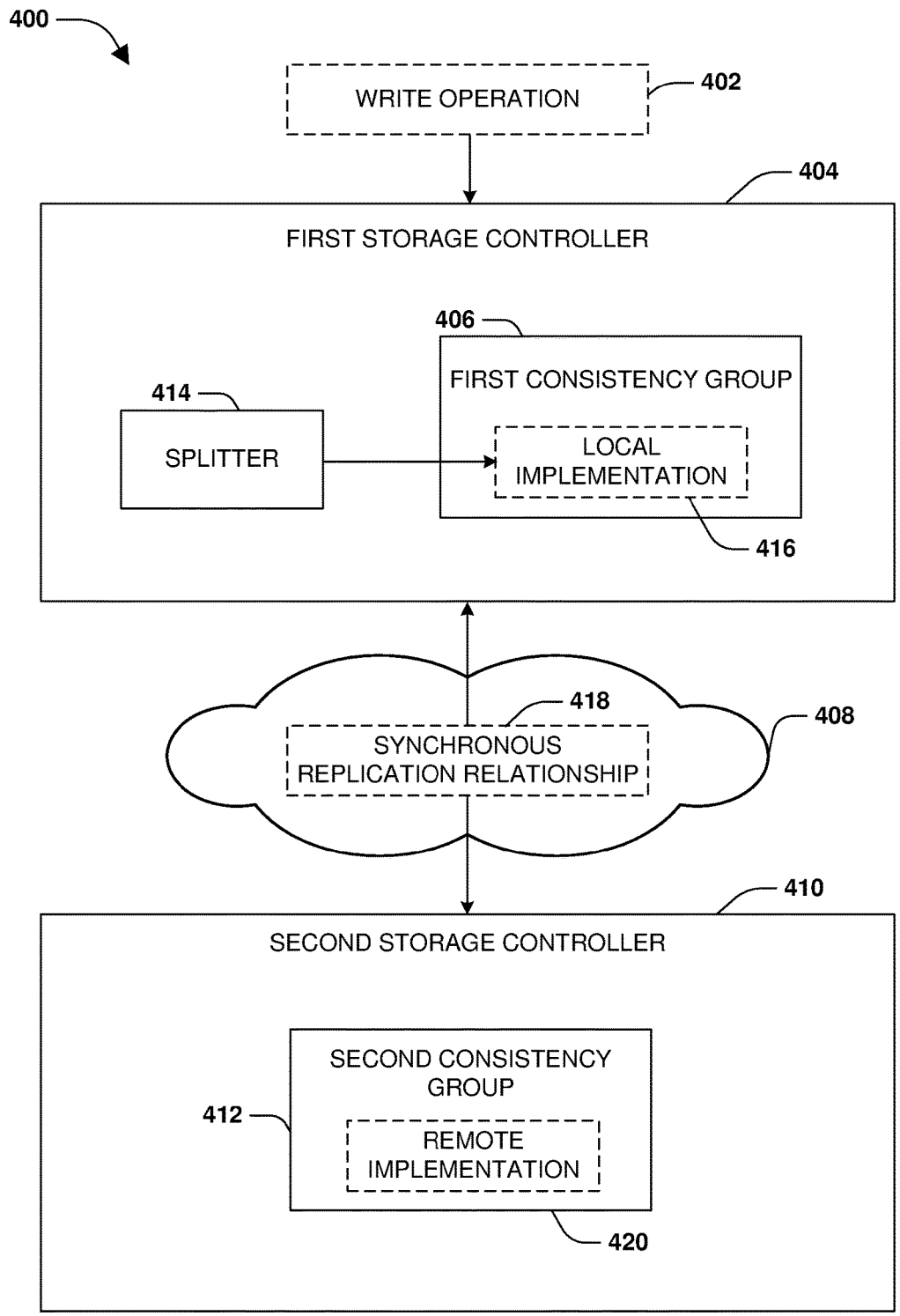
FIG. 4A is a component block diagram illustrating an exemplary computing device for pseudo common snapshot creation, where a write operation is locally implemented by a first storage controller and remotely implemented by a second storage controller based upon a synchronous replication relationship.

FIGS. 4A-4H illustrate examples of a system 400 for resynchronization. FIG. 4A illustrates a first storage controller 404 having a synchronous replication relationship 418 with a second storage controller 410. The first storage controller 404 and the second storage controller 410 may be configured to communicate with one another over a network 408. In an example, the synchronous replication relationship 418 may be specified between a first consistency group 406 (e.g., one or more files and/or LUNs within a volume or spanning multiple volumes hosted by the first storage controller 404) and a second consistency group 412 (e.g., one or more files and/or LUNs within a volume or spanning multiple volumes hosted by the second storage controller 410) that is a backup replication of the first consistency group 406. Accordingly, a write operation 402, targeting the first consistency group 406, may be intercepted. A splitter 414 for the first consistency group 406 may locally implement 416 the write operation 402 upon the first consistency group 406, and may send a copy of the write operation 402 to the second storage controller 410 for remote implementation 420 upon the second consistency group 412. Responsive to both the local implementation 416 and the remote implementation 420 successfully completing, an acknowledgement may be provided back to a client that sent the write operation 402.

Figure 4B:
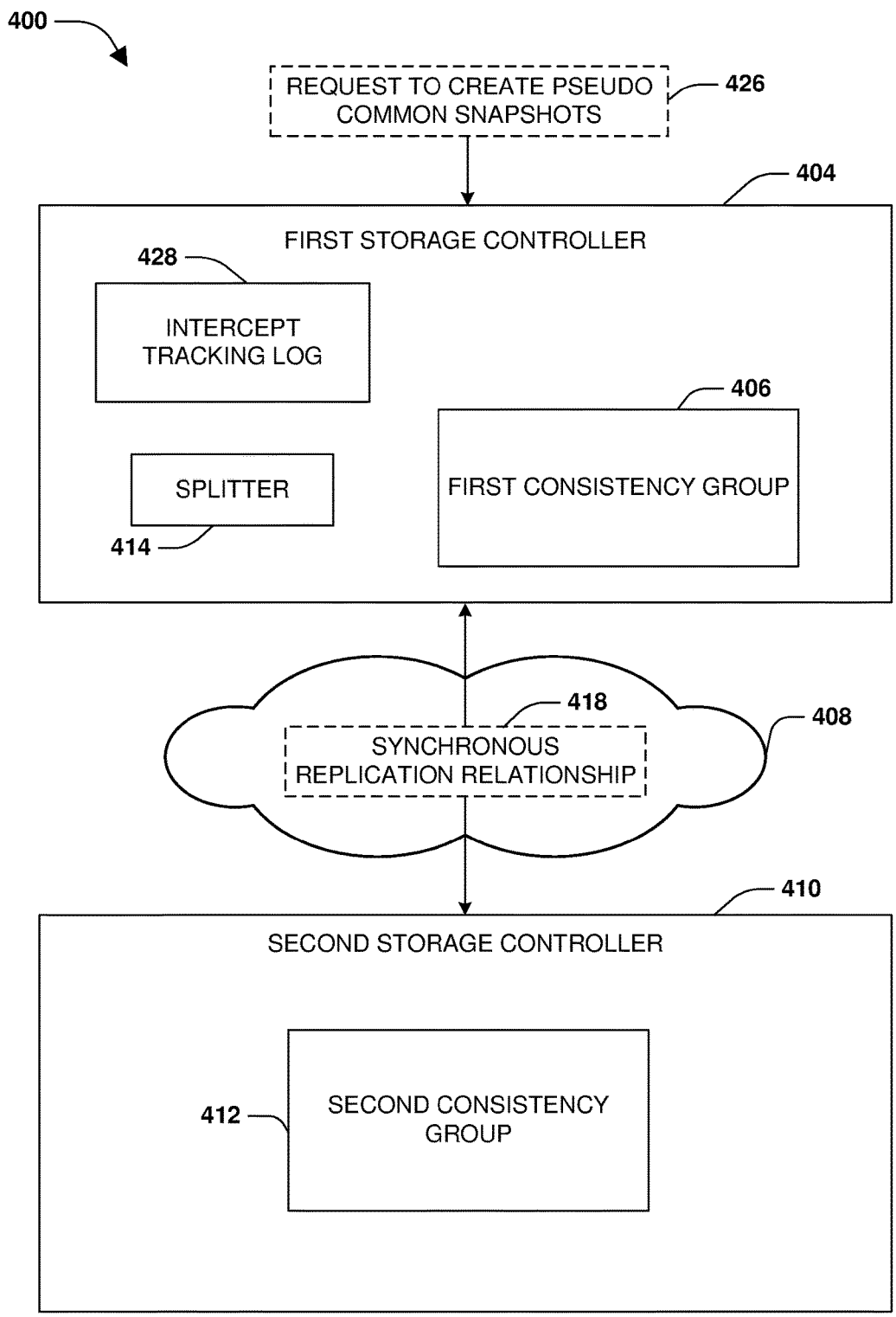
FIG. 4B is a component block diagram illustrating an exemplary computing device for pseudo common snapshot creation, where a request to create pseudo common snapshots is received.
Figure 4C:
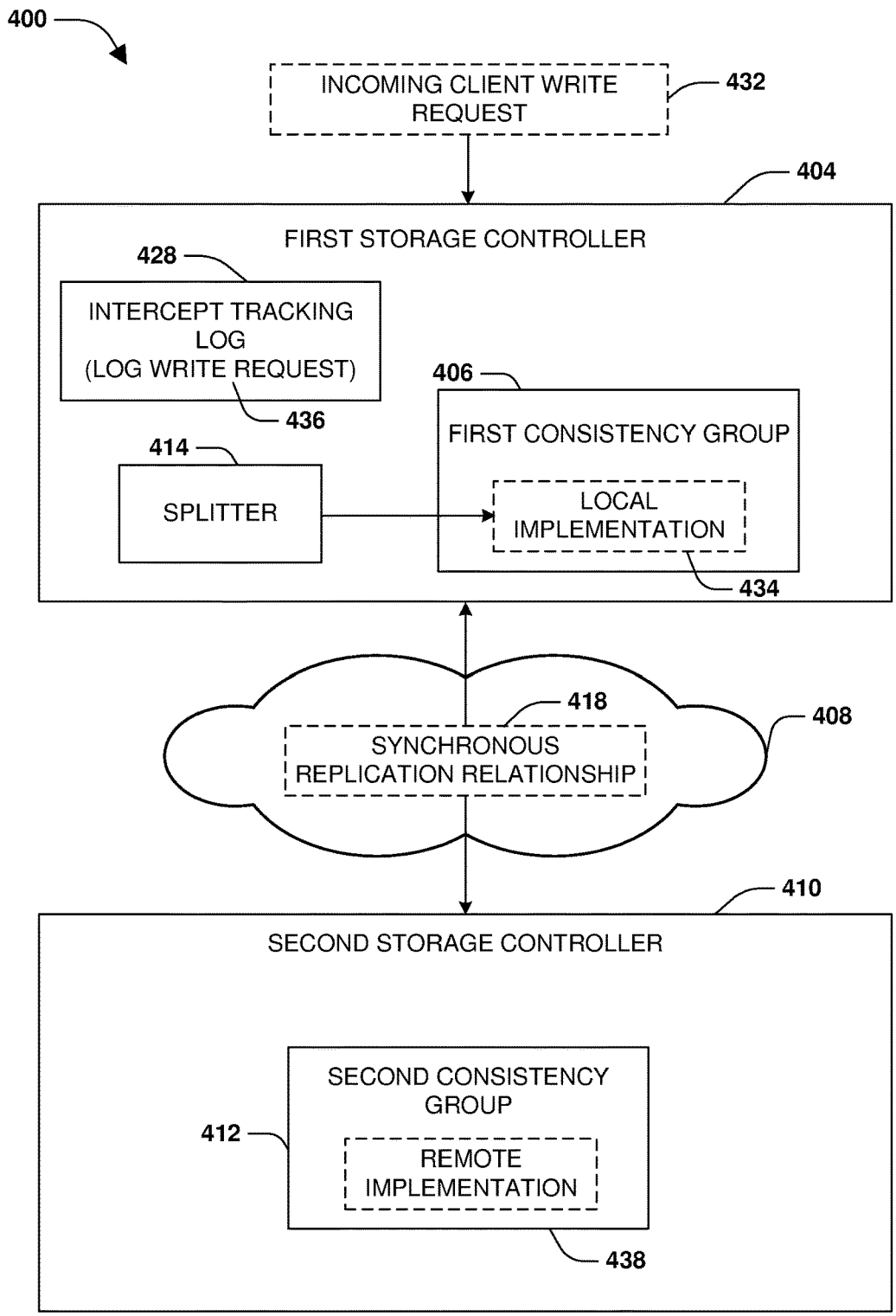
FIG. 4C is a component block diagram illustrating an exemplary computing device for pseudo common snapshot creation, where incoming client write requests are logged.

FIG. 4B illustrates a request 426, to create pseudo common snapshots, being received. Accordingly, logging, of incoming client write requests, to an intercept tracking log 428 is enabled. FIG. 4C illustrates logging of an incoming client write request 432. For example, the incoming client write request 432, targeting the first consistency group 406, may be intercepted by the splitter 414 at the first storage controller 404. The splitter 414 may split the incoming client write request 432 into a replicated client write request that is sent to the second storage controller 410 for remote implementation 438 upon the second consistency group 412. The incoming client write request 432 may be logged 436 into the intercept tracking log 428, and may be locally implemented 434 upon the first consistency group 406.

Figure 4D:
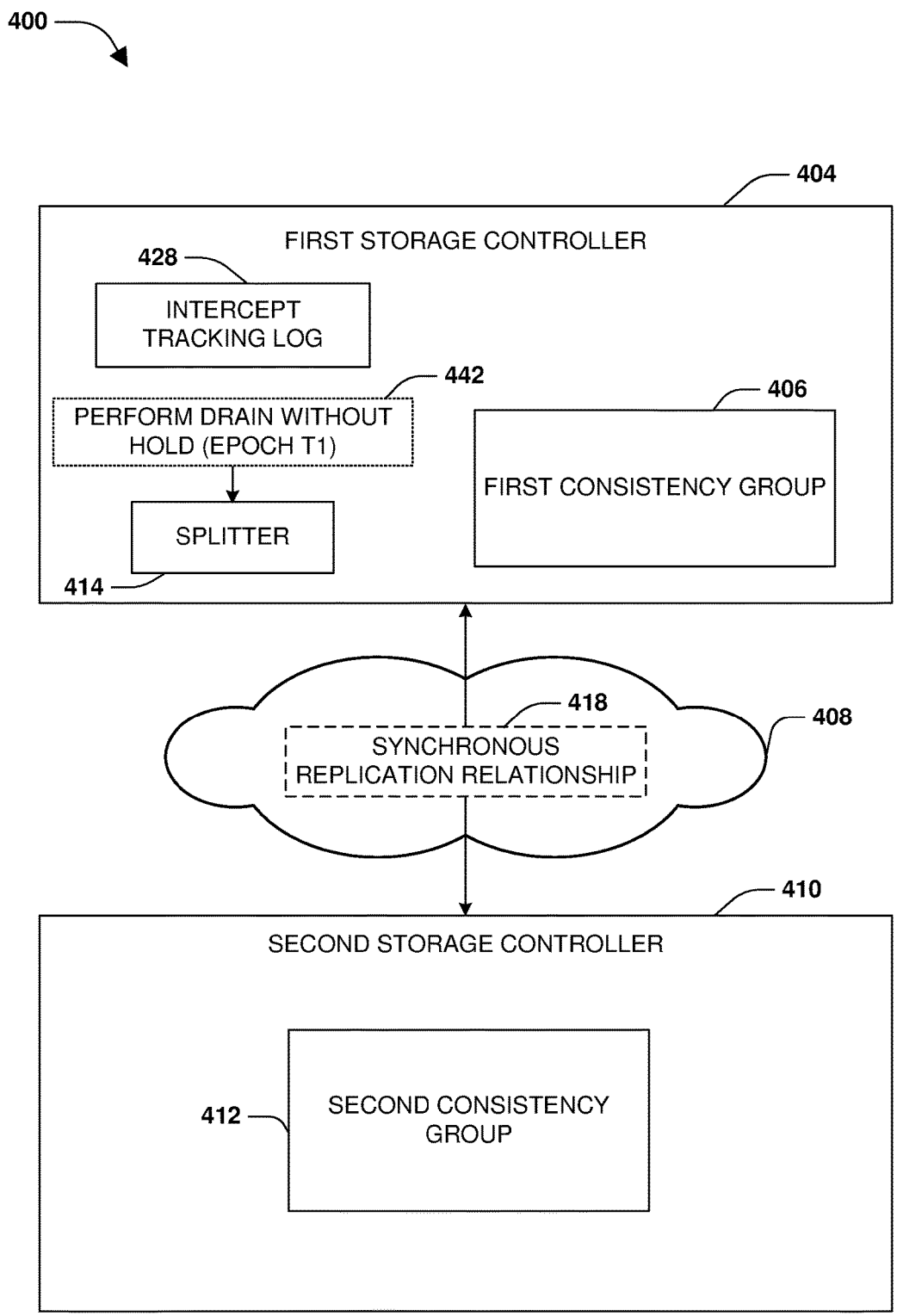
FIG. 4D is a component block diagram illustrating an exemplary computing device for pseudo common snapshot creation, where a first drain without hold is performed.

FIG. 4D illustrates a first drain without hold operation 442 being performed to drain inflight client write requests occurring before a first point in time (e.g., an epoch time may be changed to a new epoch time T1, such that inflight client write requests occurring before the new epoch time T1 may be drained and completed). While the first drain without hold operation 442 is being performed, new incoming client write requests, occurring after the first point in time are allowed to proceed normally. The new incoming client write requests are not affected or delayed by the first drain with hold operation 442.

Figure 4E:
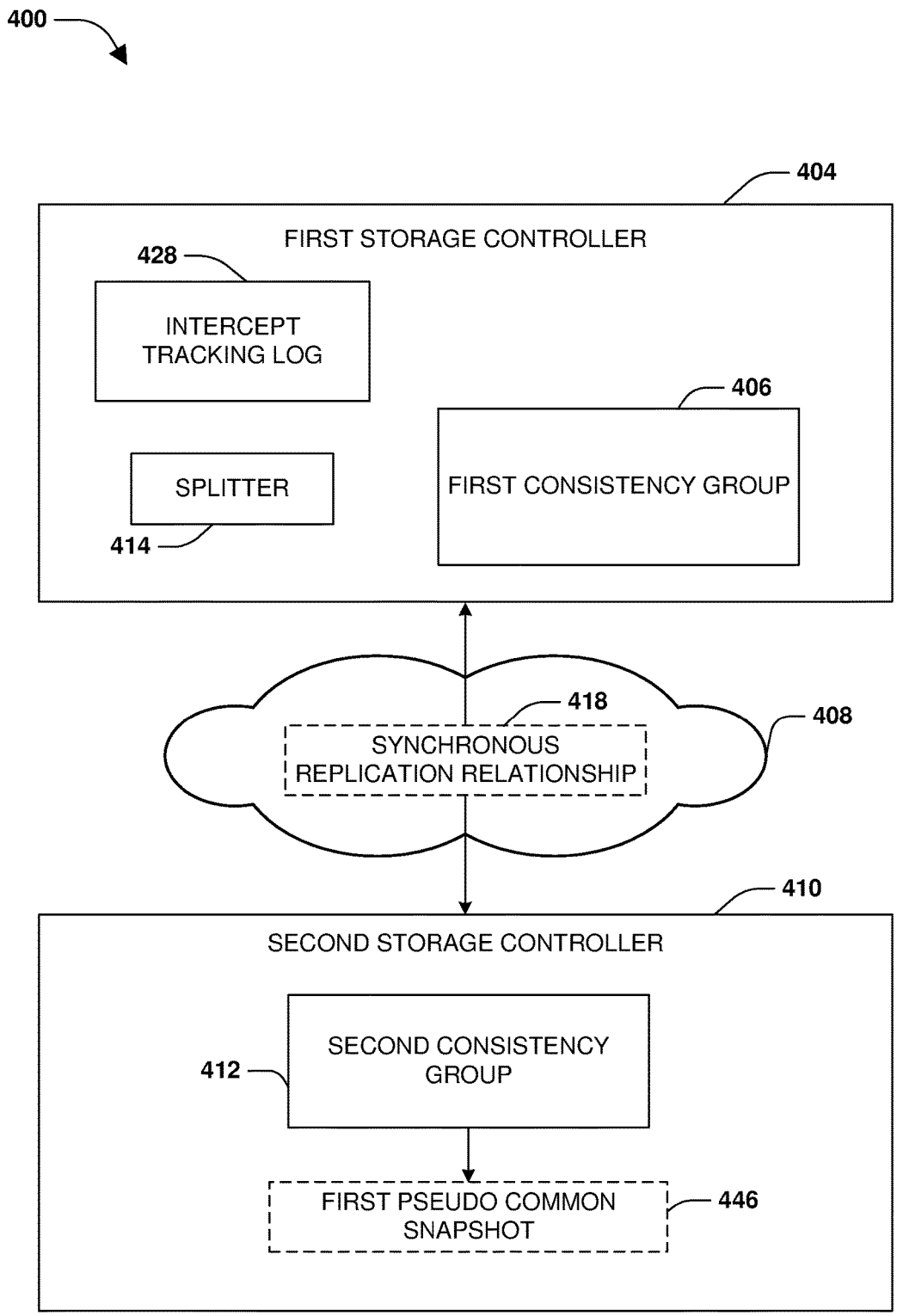
FIG. 4E is a component block diagram illustrating an exemplary computing device for pseudo common snapshot creation, where a first pseudo common snapshot is created.

FIG. 4E illustrates a first pseudo common snapshot 446 being captured by the second storage controller 410 without pausing incoming client write requests to the first storage controller 404 and/or the second storage controller 410. The first pseudo common snapshot 446 may capture a point in time representation of the second consistency group 412 (e.g., a second volume comprising the second consistency group 412).

Figure 4F:
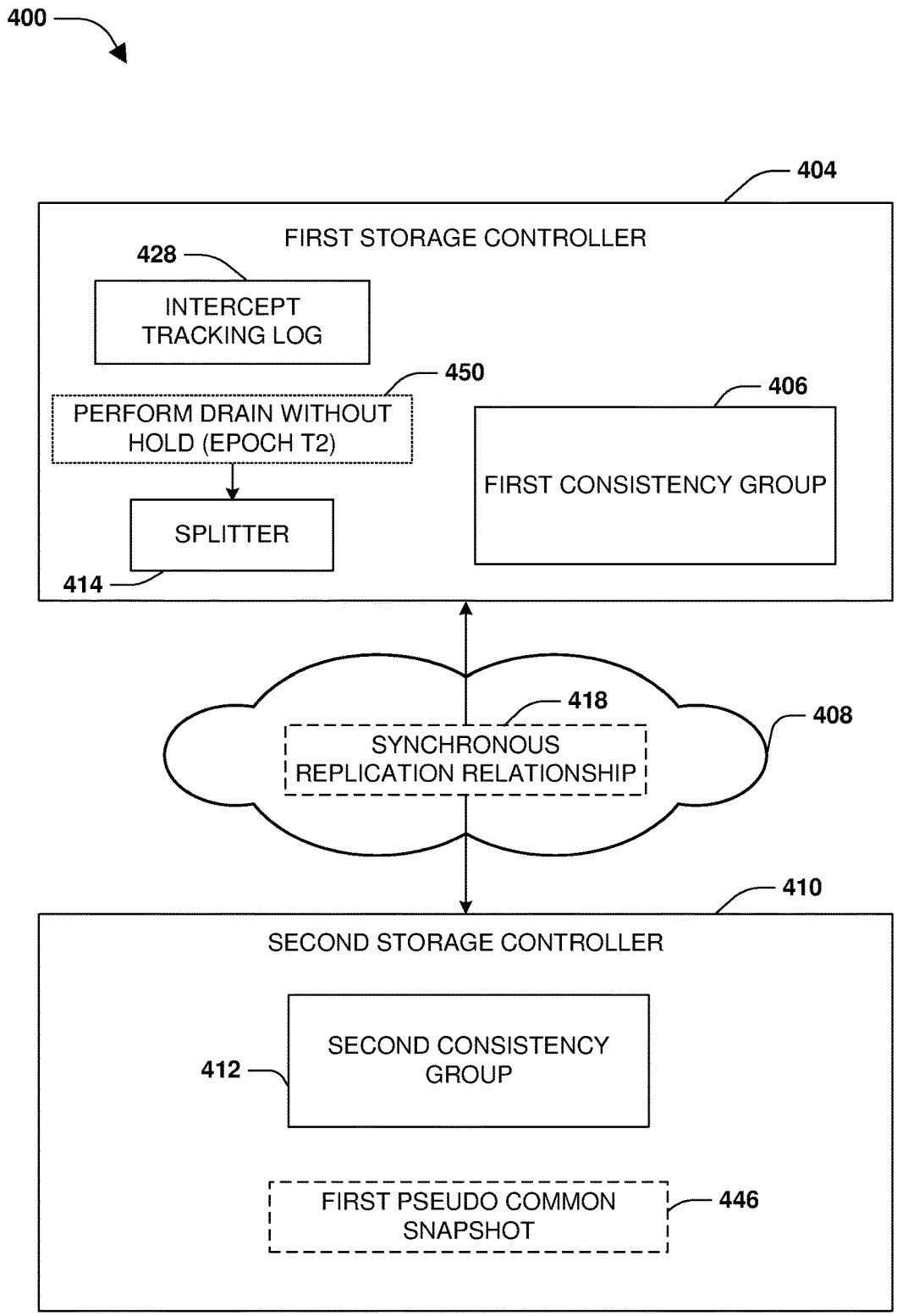
FIG. 4F is a component block diagram illustrating an exemplary computing device for pseudo common snapshot creation, where a second drain without hold is performed.

FIG. 4F illustrates a second drain without hold operation 450 being performed to drain inflight client write requests occurring before the creation of the first pseudo common snapshot (e.g., the epoch may be changed to a new epoch time T2, such that inflight client write requests occurring before the new epoch time T2 may be drained and completed). While the second drain without hold operation 450 is being performed, new incoming client write requests, occurring after the new epoch time T2, are parallel split and implemented as normal.

Figure 4G:
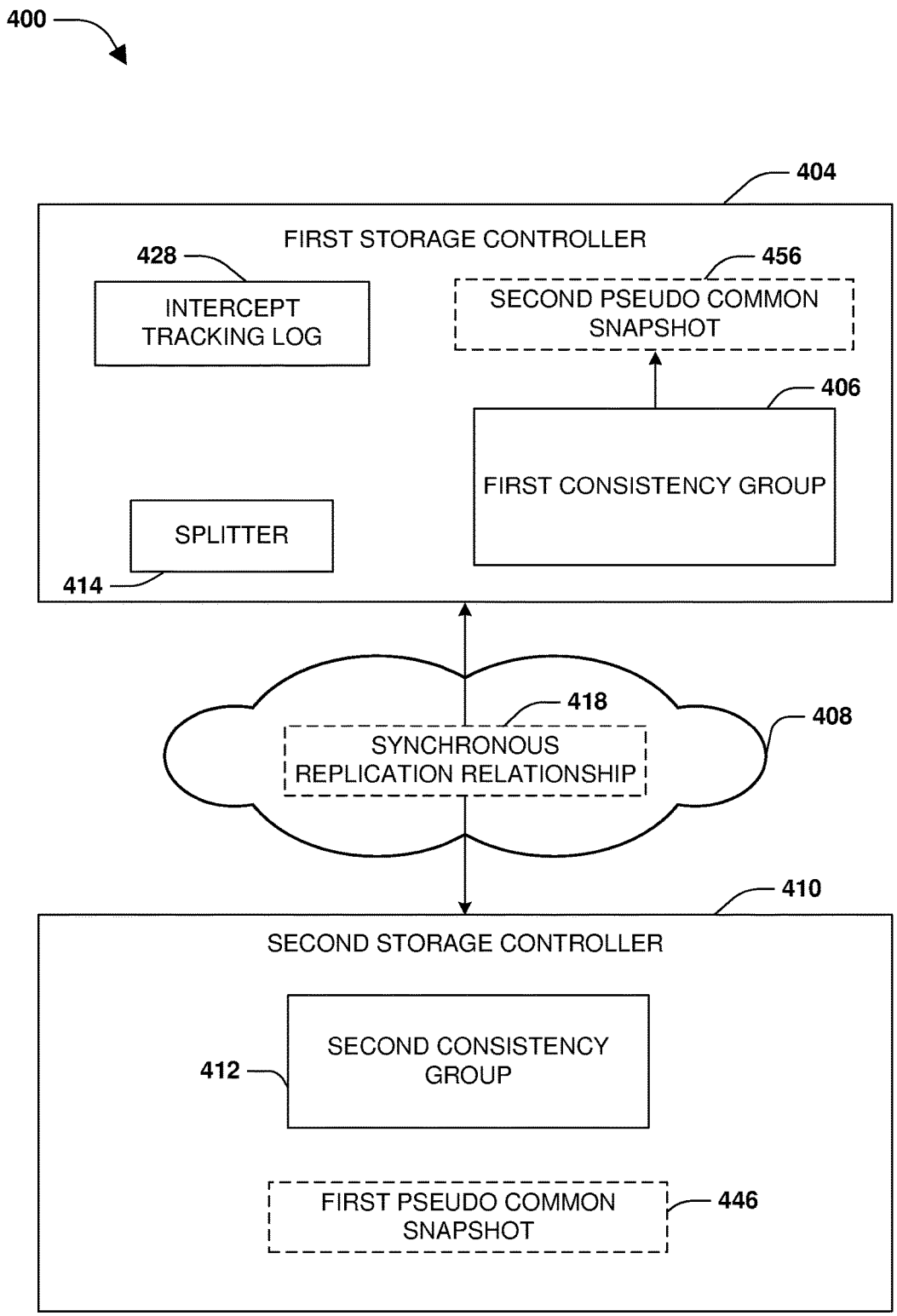
FIG. 4G is a component block diagram illustrating an exemplary computing device for pseudo common snapshot creation, where a second pseudo common snapshot is created.

FIG. 4G illustrates a second pseudo common snapshot 456 being captured by the first storage controller 404 without pausing incoming client write requests to the first storage controller 404 and/or the second storage controller 410. The second pseudo common snapshot 456 may capture a point in time representation of the first consistency group 406 (e.g., a first volume comprising the first consistency group 406).

Figure 4H:
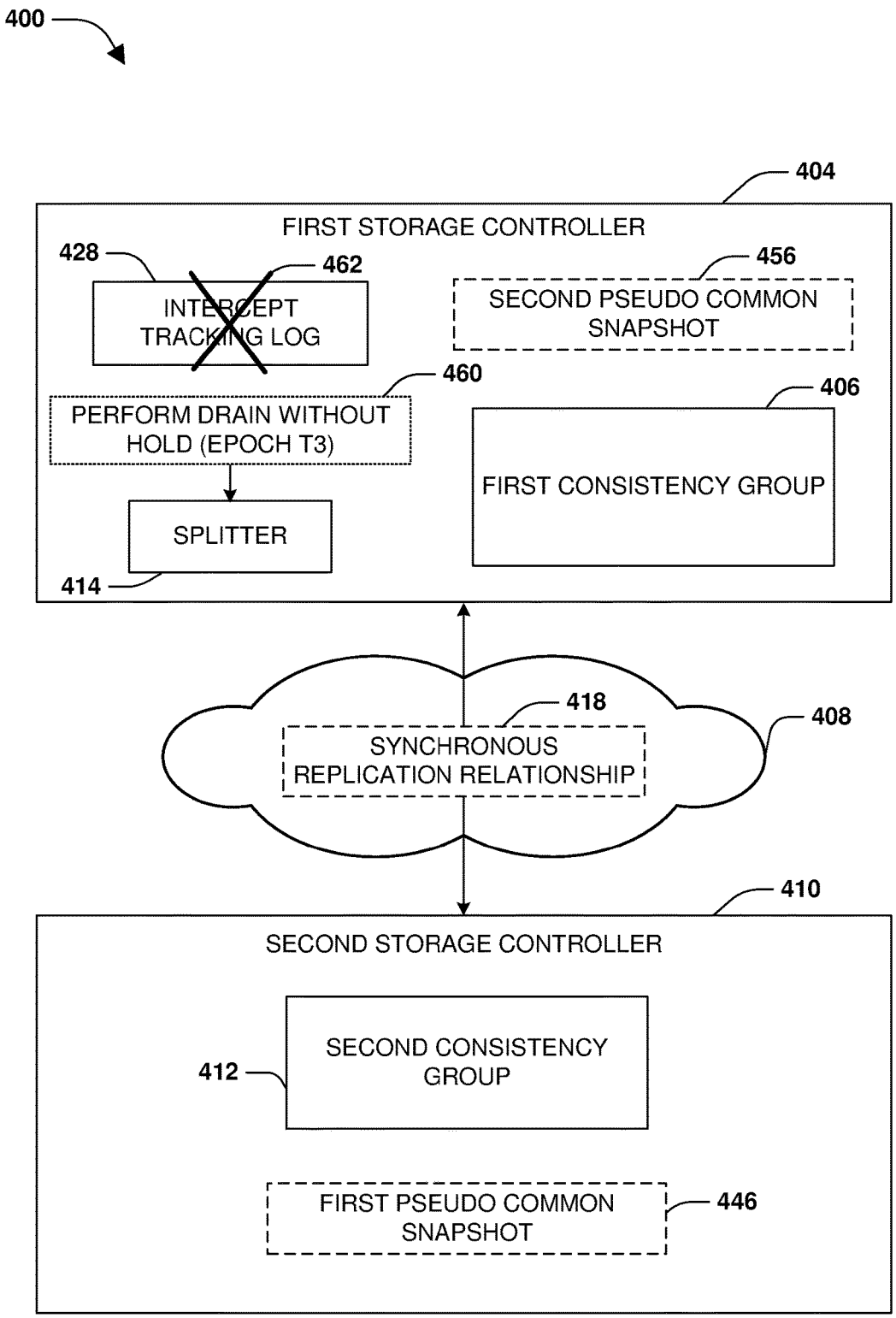
FIG. 4H is a component block diagram illustrating an exemplary computing device for pseudo common snapshot creation, where an intercept tracking log is deleted.

FIG. 4H illustrates the logging of incoming client write requests being stopped. Once the logging has stopped, a third drain without hold operation 460 may be performed to drain inflight client write operations so that when the intercept tracking log 428 is deleted 462, there are no inflight client write operations attempting to write to the deleted intercept tracking log 428, which may otherwise cause errors. In this way, the intercept tracking log 428 may be deleted 462 after the third drain without hold operation 460 is complete.

Figure 5A:
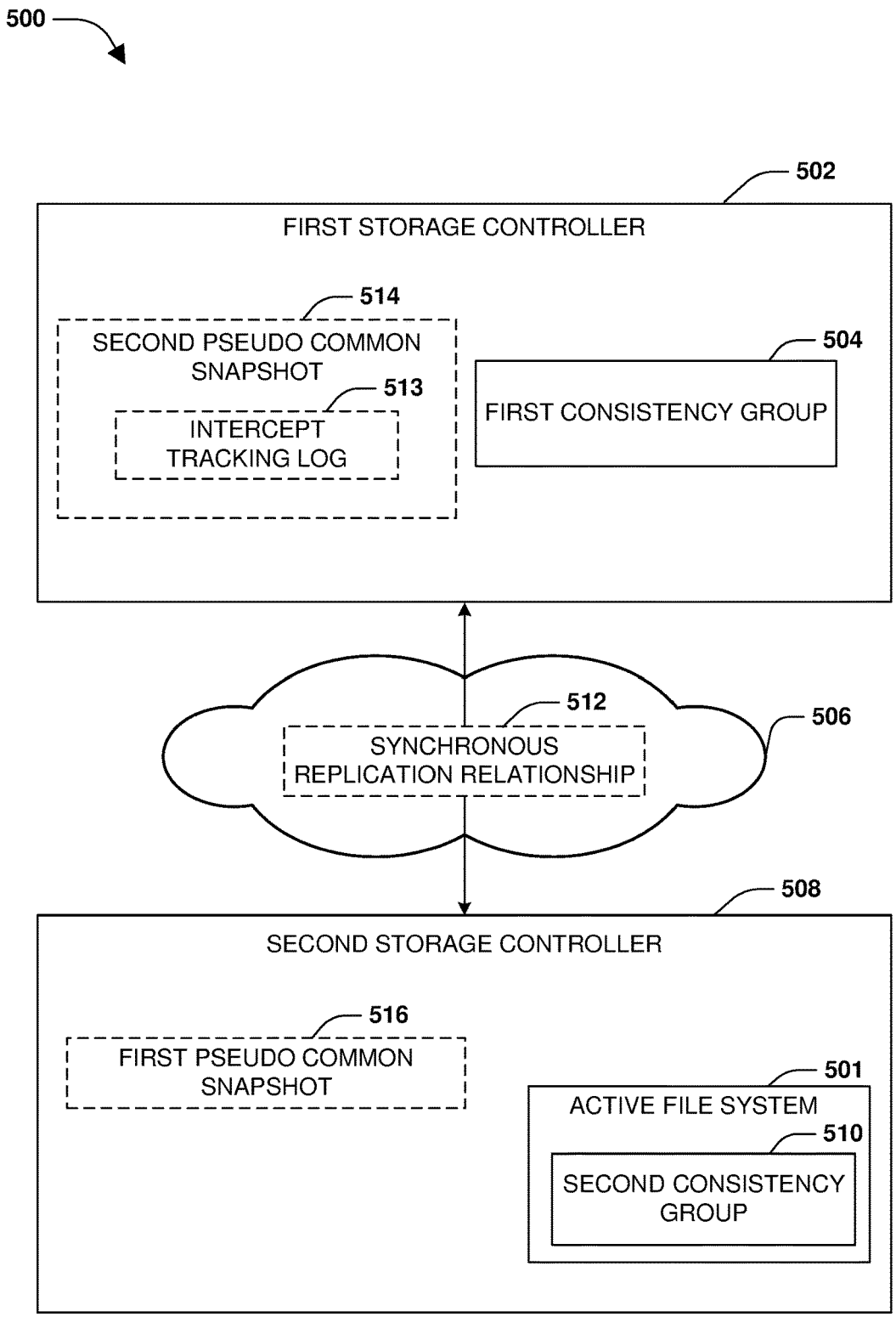
FIG. 5A is a component block diagram illustrating an exemplary computing device for resynchronization using pseudo common snapshots.

FIGS. 5A-5F illustrate examples of a system 500 for forward resynchronization. FIG. 5A illustrates a first storage controller 502 having a synchronous replication relationship 512 with a second storage controller 508. The first storage controller 502 and the second storage controller 508 may be configured to communicate with one another over a network 506. In an example, the synchronous replication relationship 512 may be specified between a first consistency group 504 (e.g., one or more files and/or LUNs within a volume or spanning multiple volumes hosted by the first storage controller 502) and a second consistency group 510 (e.g., one or more files and/or LUNs within a volume or spanning multiple volumes hosted by the second storage controller 508) that is a backup replication of the first consistency group 504. The second consistency group 510 may be hosted by an active file system 501 of the second storage controller 508.

A first pseudo common snapshot 516, of the second consistency group 510, may have been captured by the second storage controller 508. A second pseudo common snapshot 514, of the first consistency group 504, may have been captured by the first storage controller 504. The second pseudo common snapshot 514 may capture an intercept tracking log 513 at a state that is indicative of a delta between the first pseudo common snapshot 516 and the second pseudo common snapshot 514. The delta may correspond to a data difference between the first consistency group 504 and the second consistency group 510 as reflected between the first pseudo common snapshot 516 and the second pseudo common snapshot 514 (e.g., deltas resulting from client write requests processed between when the first pseudo common snapshot 516 was captured and when the second pseudo common snapshot 514 was subsequently captured).

Figure 5B:
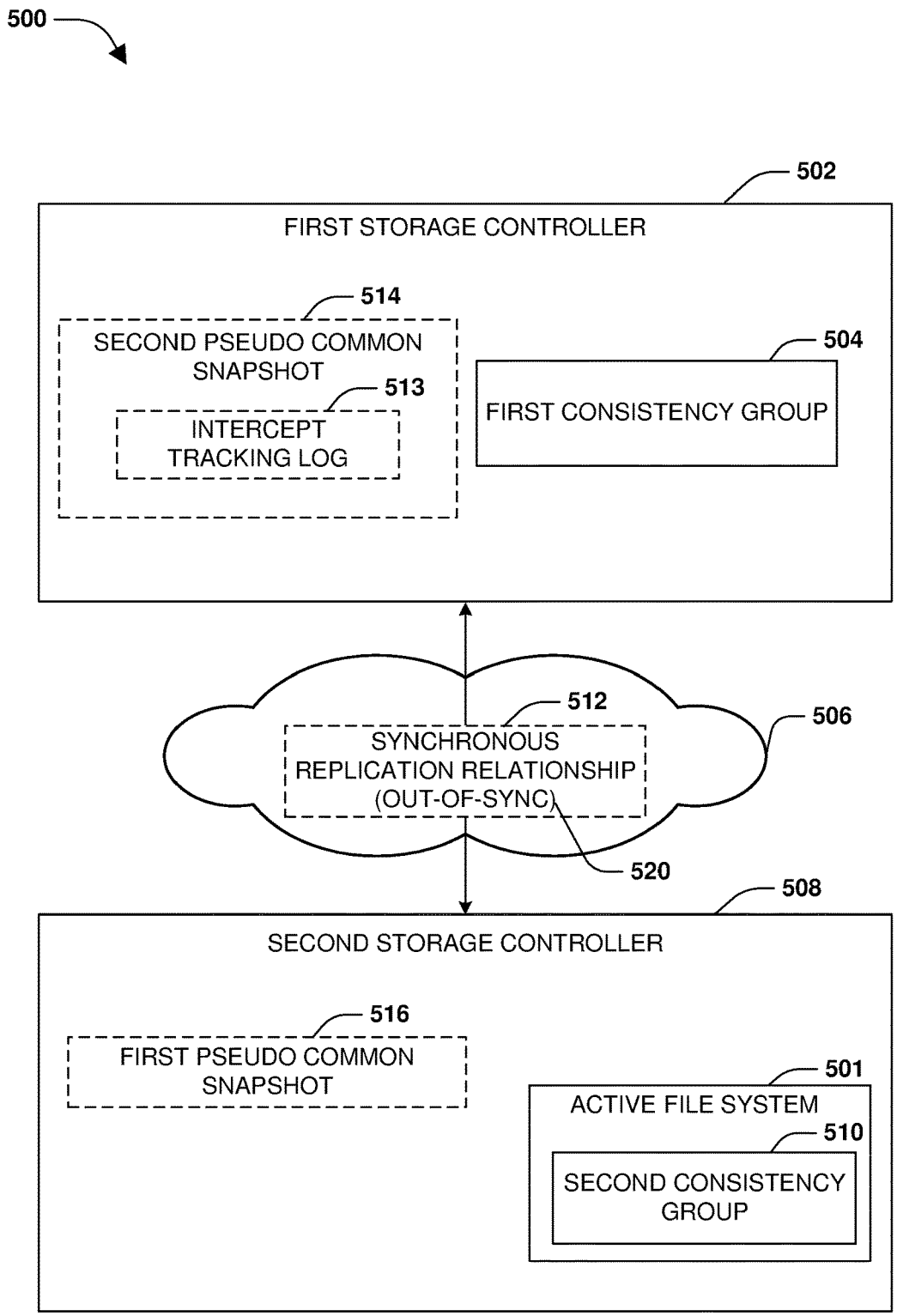
FIG. 5B is a component block diagram illustrating an exemplary computing device for resynchronization using pseudo common snapshots, where a synchronous replication relationship goes out-of-sync.

FIG. 5B illustrates the synchronous replication relationship 512 transitioning into an out-of-sync state 502. For example, connectivity between the first storage controller 502 and the second storage controller over the network 506 may be interrupted, such that the first storage controller 502 continues processing incoming client write requests without replicating the incoming client write requests to the second storage controller 508. Accordingly, the second consistency group 510 may fall behind the first consistency group 504 because the first consistency group 504 may comprise more up-to-date data.

Figure 5C:
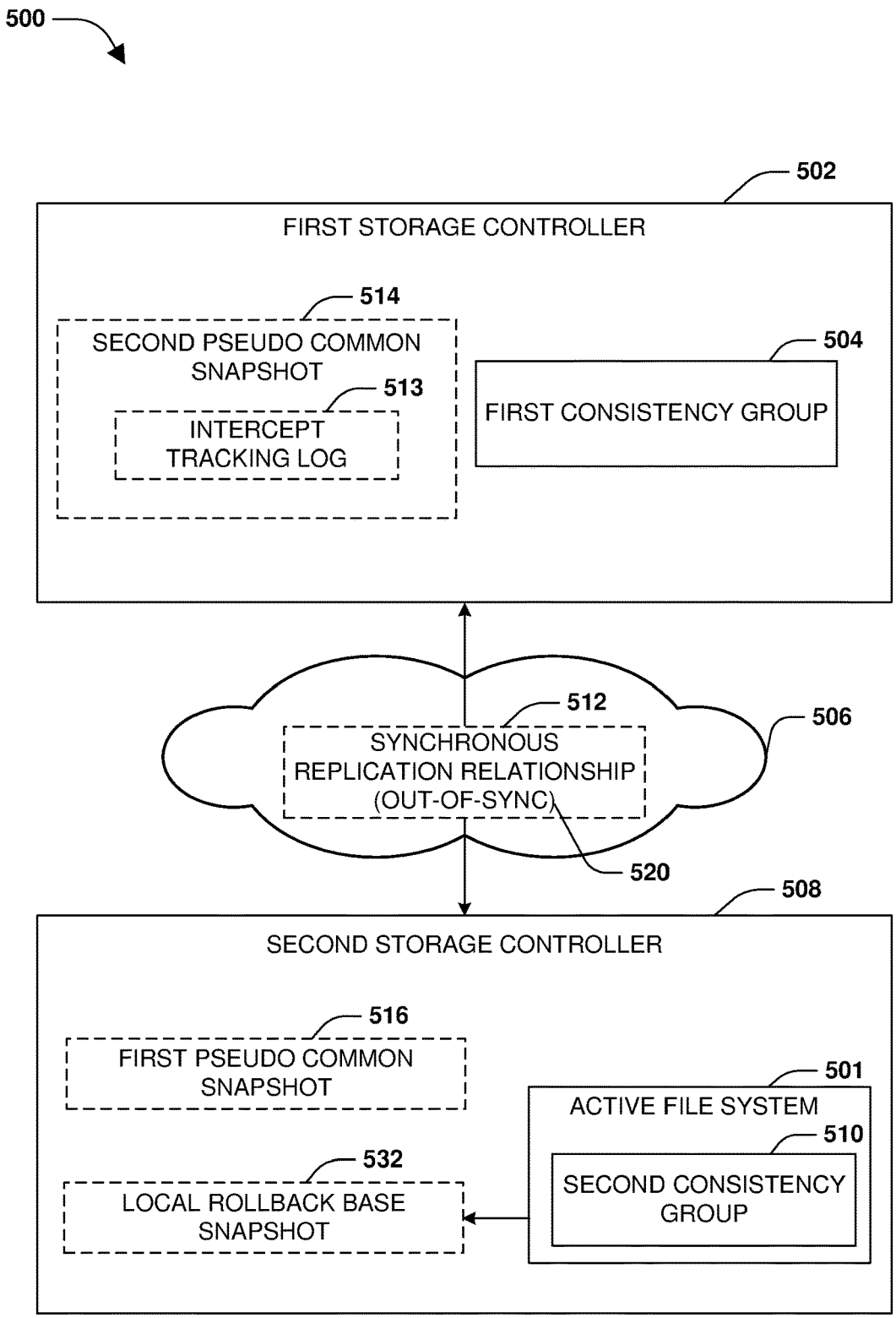
FIG. 5C is a component block diagram illustrating an exemplary computing device for resynchronization using pseudo common snapshots, where a local rollback base snapshot is created.
Figure 5D:
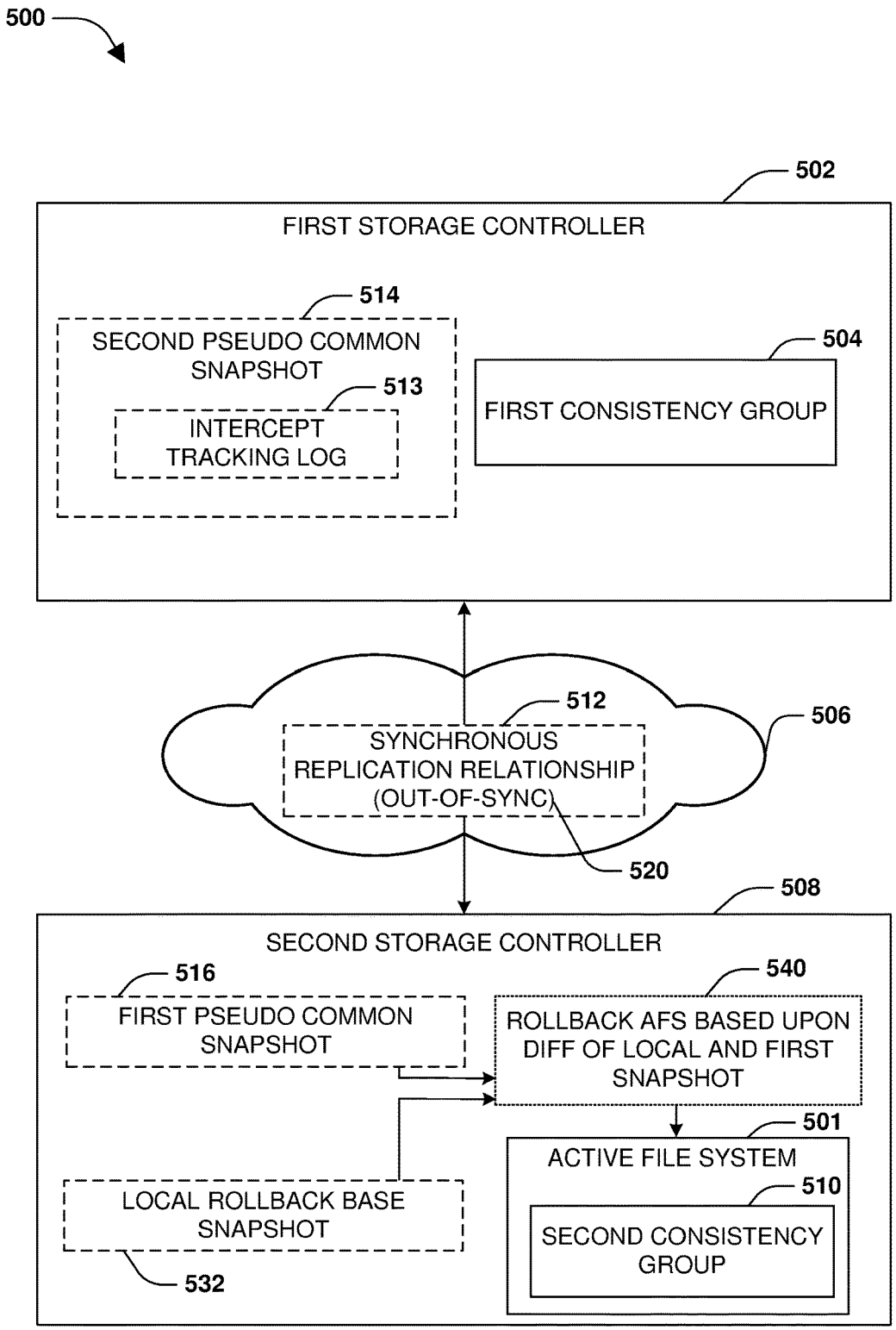
FIG. 5D is a component block diagram illustrating an exemplary computing device for resynchronization using pseudo common snapshots, where an active file system is rolled back.
Figure 5E:
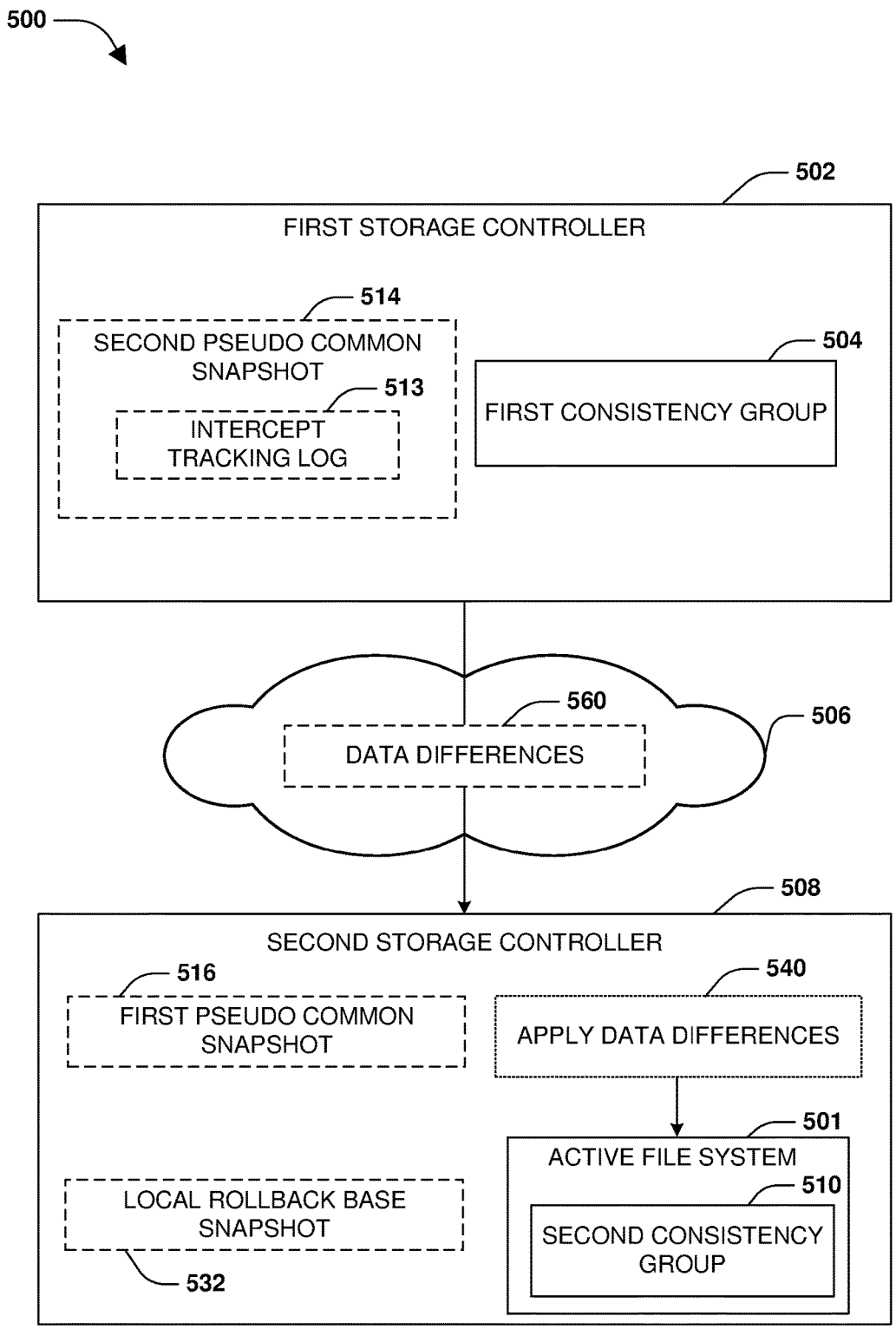
FIG. 5E is a component block diagram illustrating an exemplary computing device for resynchronization using pseudo common snapshots, where data differences are applied to a second consistency group.
Figure 5F:
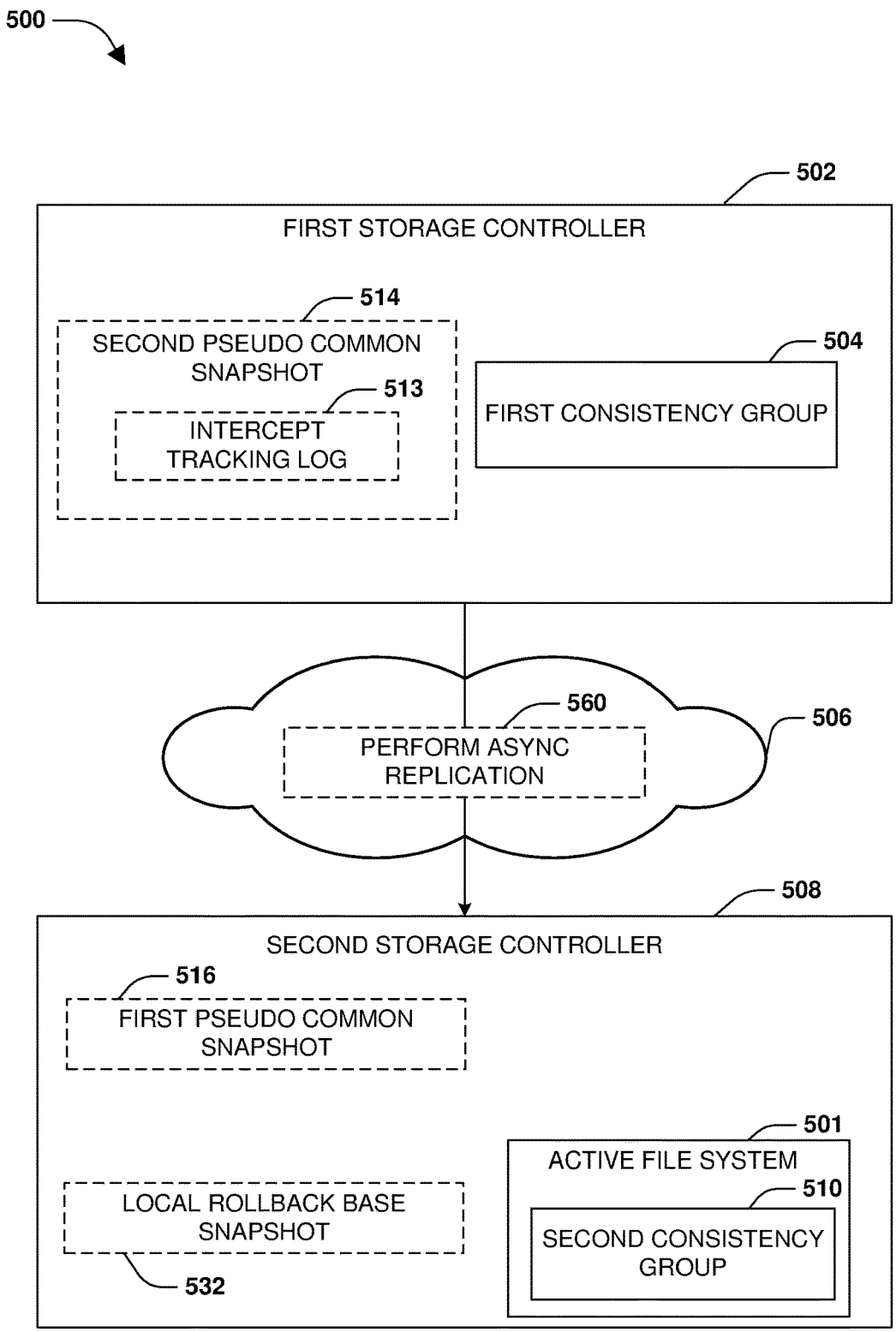
FIG. 5F is a component block diagram illustrating an exemplary computing device for resynchronization using pseudo common snapshots, where async replication is performed.

FIG. 5C illustrates a local rollback base snapshot 532 of the active file system 501 being created. The local rollback base snapshot 532 may correspond to a point in time representation of the active file system 501, such as the second consistency group 510. FIG. 5D illustrates the active file system 501 being rolled back 540 based upon a difference between the local rollback base snapshot 532 and the first pseudo common snapshot 516. FIG. 5E illustrates data differences 560, identified within the intercept tracking log 513 captured within the second pseudo common snapshot 514, being applied 540 to the second consistency group 510 until the second consistency group 510 mirrors the first consistency group 504 as captured by the second pseudo common snapshot 514. For example, the first storage controller 502 may send dirty data, as the data differences 560, from the second pseudo common snapshot 514 to the second storage controller 508 for applying 540 to the second consistency group 510. FIG. 5F illustrates an asynchronous replication 560 being performed to synchronize the second consistency group 510 with a current state of the first consistency group 504 (e.g., incremental snapshots of the first consistency group 504, such as of a volume and/or active file system hosting the first consistency group 504, may be used to perform incremental transfers to the second storage controller 508 for updating the second consistency group 510).

Figure 6A:
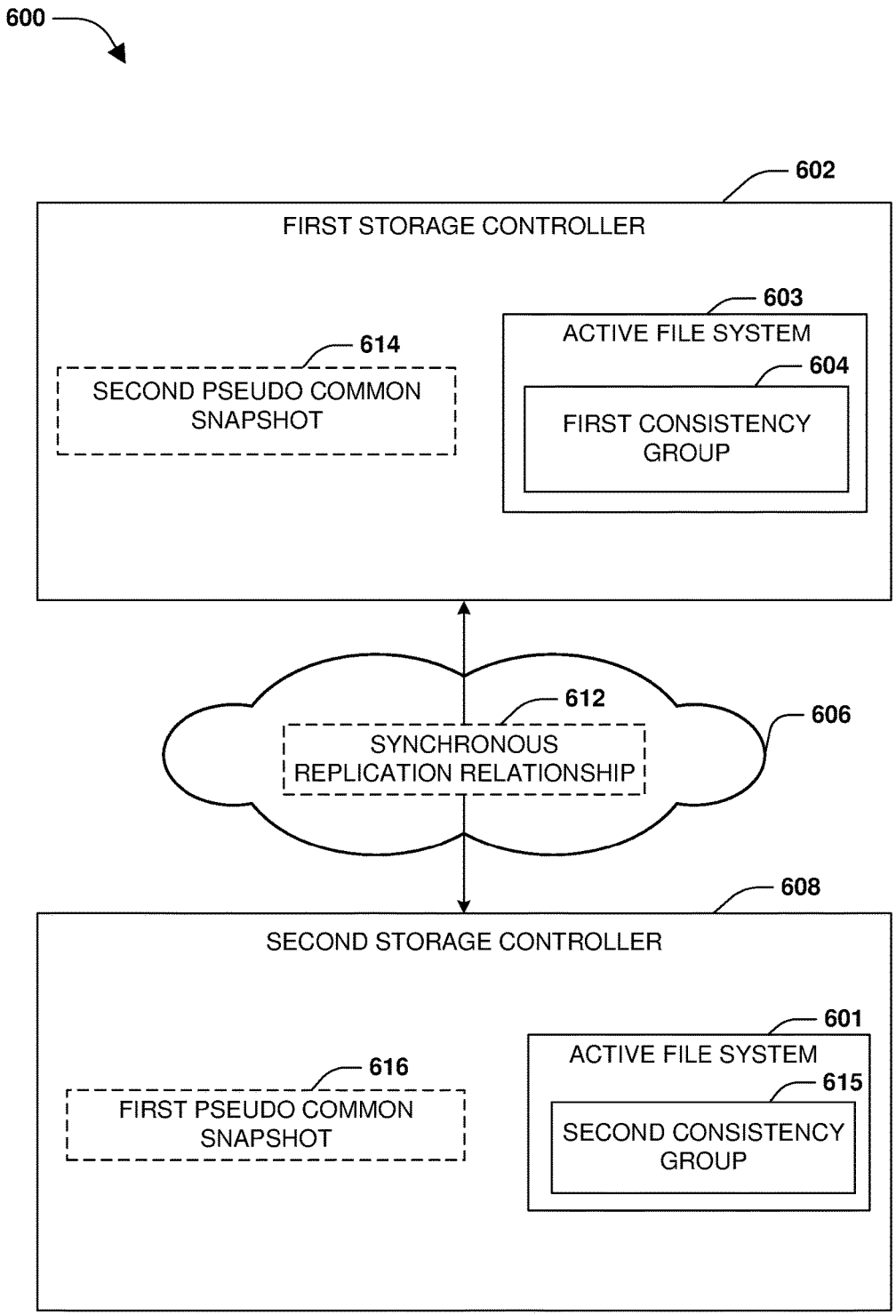
FIG. 6A is a component block diagram illustrating an exemplary computing device for resynchronization using pseudo common snapshots.

FIGS. 6A-6G illustrate examples of a system 600 for reverse resynchronization. FIG. 6A illustrates a first storage controller 602 having a synchronous replication relationship 612 with a second storage controller 608. The first storage controller 602 and the second storage controller 608 may be configured to communicate with one another over a network 606. In an example, the synchronous replication relationship 612 may be specified between a first consistency group 604 (e.g., one or more files and/or LUNs within a volume or spanning multiple volumes hosted by the first storage controller 602) and a second consistency group 615 (e.g., one or more files and/or LUNs within a volume or spanning multiple volumes hosted by the second storage controller 608) that is a backup replication of the first consistency group 604. The second consistency group 615 may be hosted by an active file system 601 of the second storage controller 608.

A first pseudo common snapshot 616, of the second consistency group 615, may have been captured by the second storage controller 608. A second pseudo common snapshot 614, of the first consistency group 604, may have been captured by the first storage controller 602. The first pseudo common snapshot 614 may capture a first intercept tracking log at a state that is indicative of a delta between when the first pseudo common snapshot 616 was captured and when the second pseudo common snapshot 614 was captured. The delta may correspond to a data difference between the first consistency group 604 and the second consistency group 615 as reflected between the first pseudo common snapshot 616 and the second pseudo common snapshot 614 (e.g., deltas resulting from client write requests processed between the capture of the first pseudo common snapshot 616 and the second pseudo common snapshot 614).

Figure 6B:
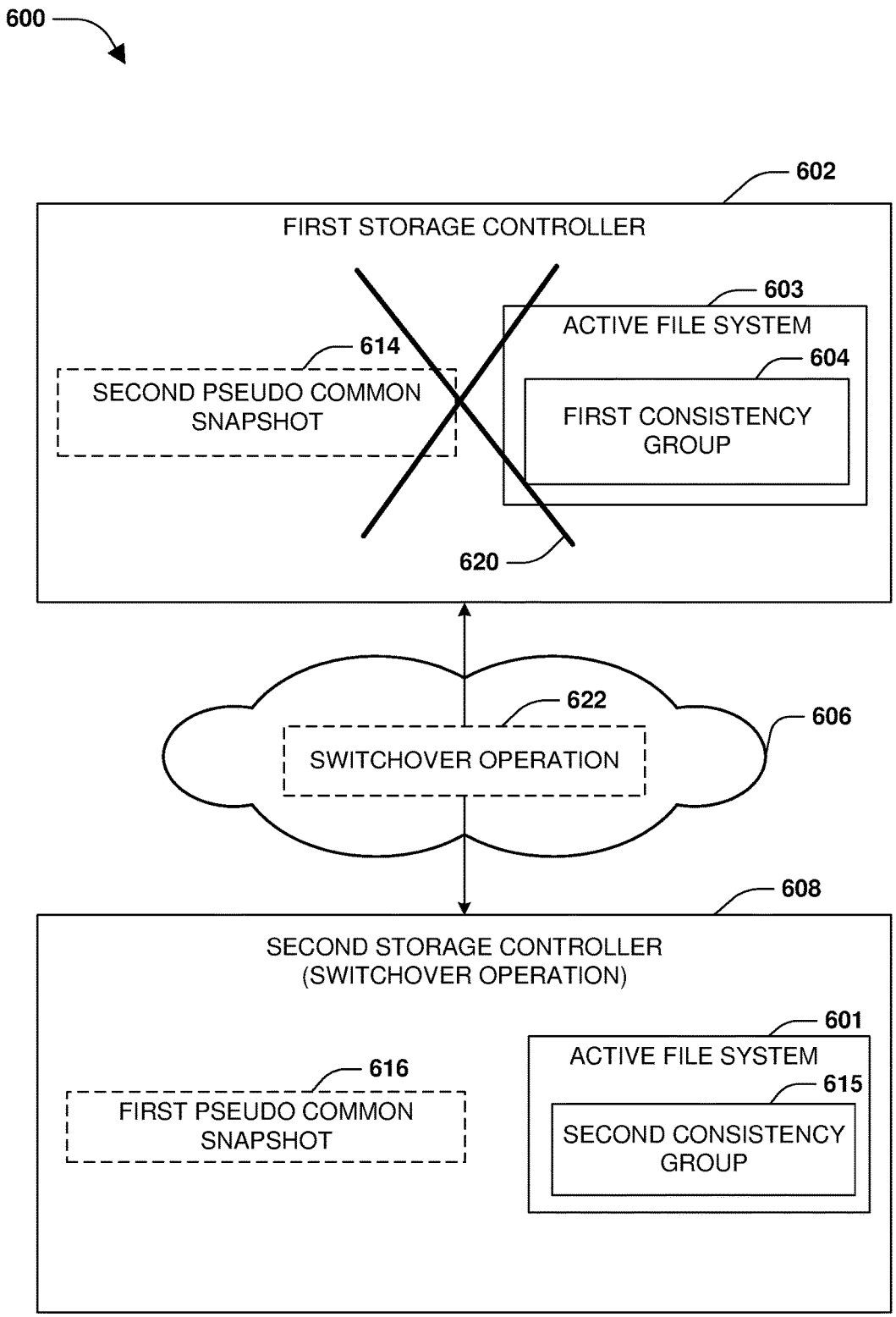
FIG. 6B is a component block diagram illustrating an exemplary computing device for resynchronization using pseudo common snapshots, where a switchover operation is performed.
Figure 6C:
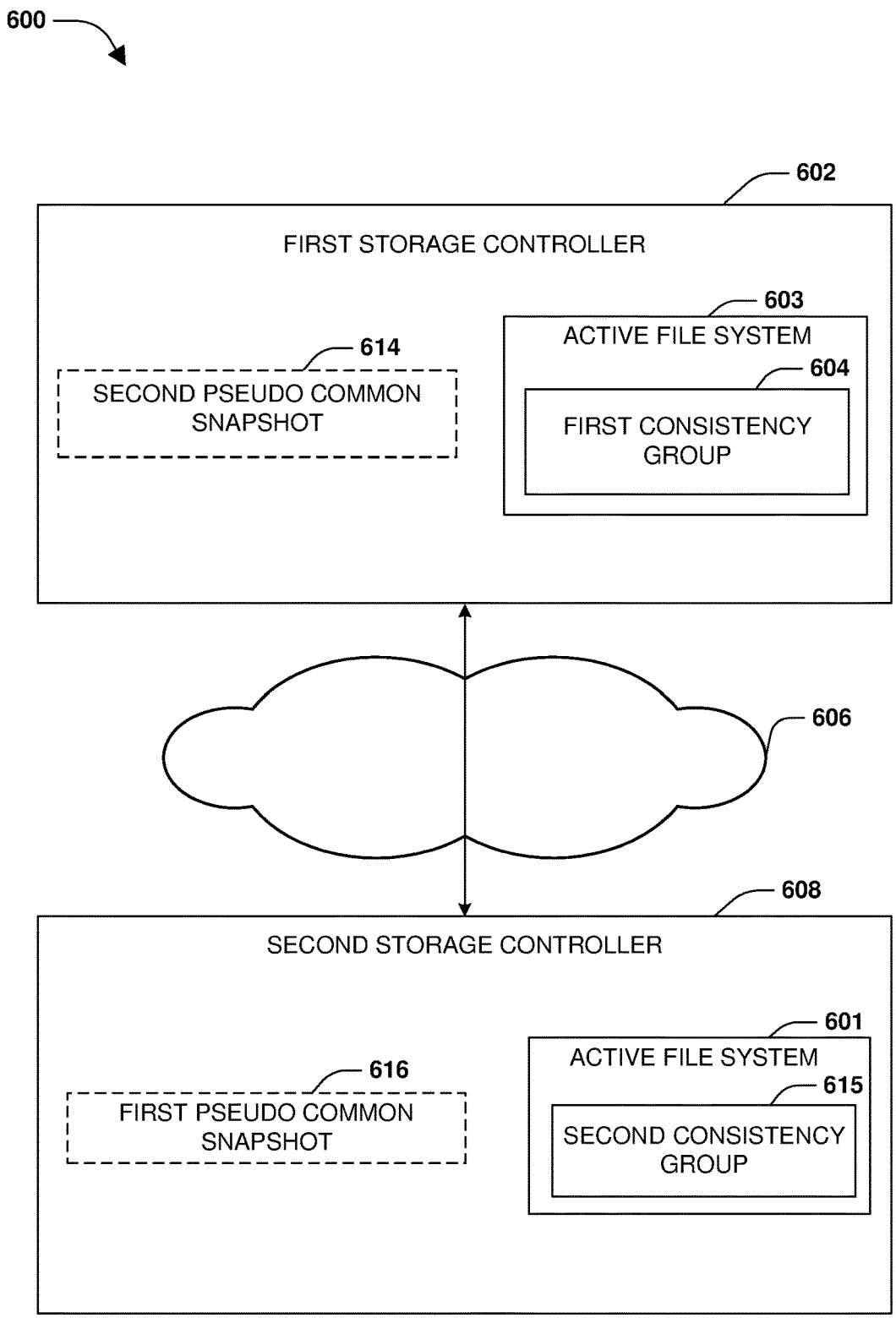
FIG. 6C is a component block diagram illustrating an exemplary computing device for resynchronization using pseudo common snapshots, a synchronous replication relationship transitions into an out-of-sync state.

FIG. 6B illustrates the first storage controller 602 experiencing a failure 620. Accordingly, the second storage controller 608 may perform a switchover operation 622 to obtain ownership of storage devices previously owned by the first storage controller 602 (e.g., ownership of a storage device comprising the second consistency group 615). In this way, the second storage controller 608 may provide clients with failover access to the storage device, such as to the second consistency group 615 that is a replication of the first consistency group 604. Because the second consistency group 615 may be modified without such modifications being replicated to the first consistency group 604 due to the failure 620, the first consistency group 604 may fall behind the second consistency group 615 because the second consistency group 615 may comprise more up-to-date data. Accordingly, the synchronous replication relationship 612 may transition into an out-of-sync state. FIG. 6C illustrates the first storage controller 602 recovering from the failure 602.

Figure 6D:
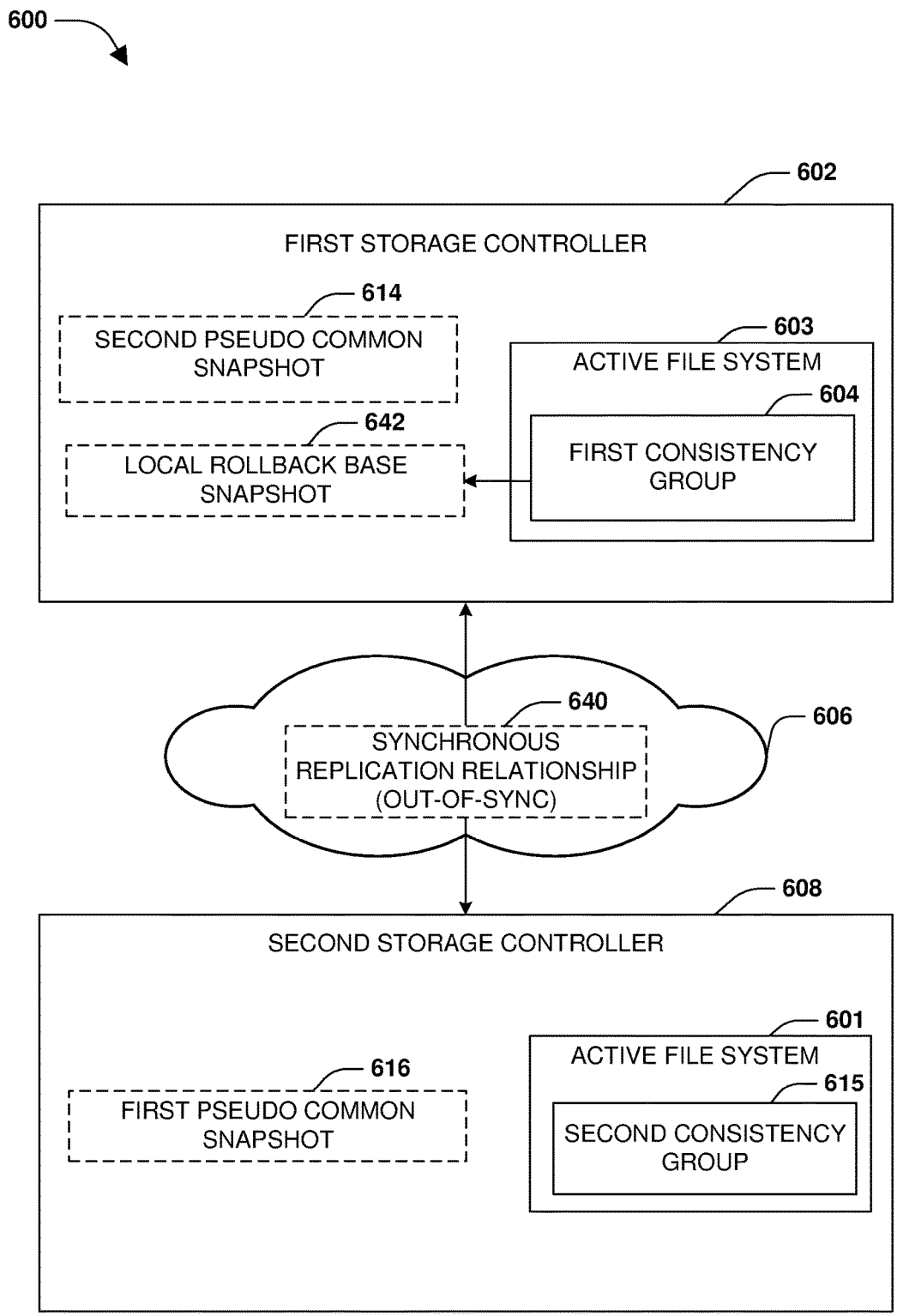
FIG. 6D is a component block diagram illustrating an exemplary computing device for resynchronization using pseudo common snapshots, where a local rollback base snapshot is created.
Figure 6E:
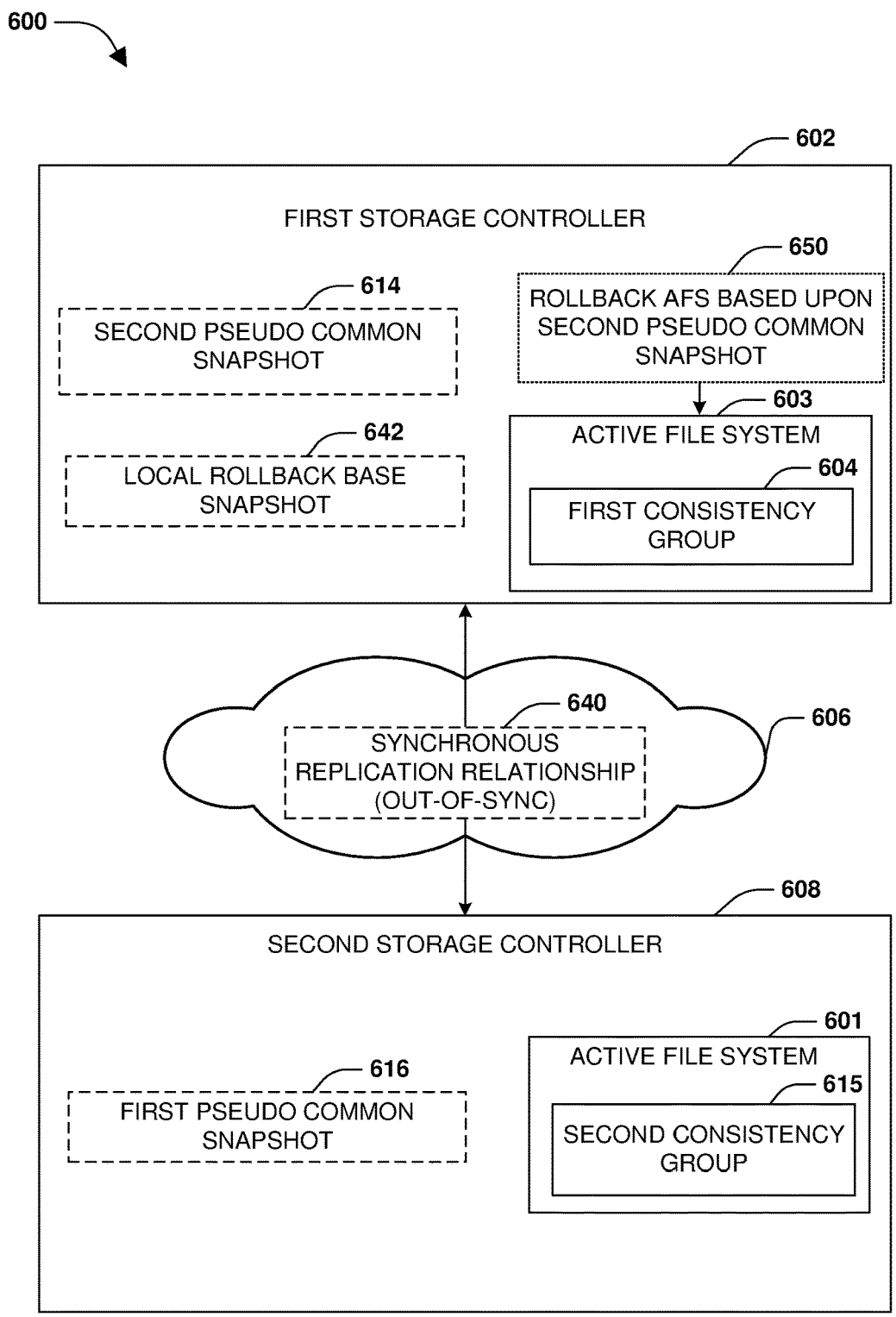
FIG. 6E is a component block diagram illustrating an exemplary computing device for resynchronization using pseudo common snapshots, where an active file system is rolled back.
Figure 6F:
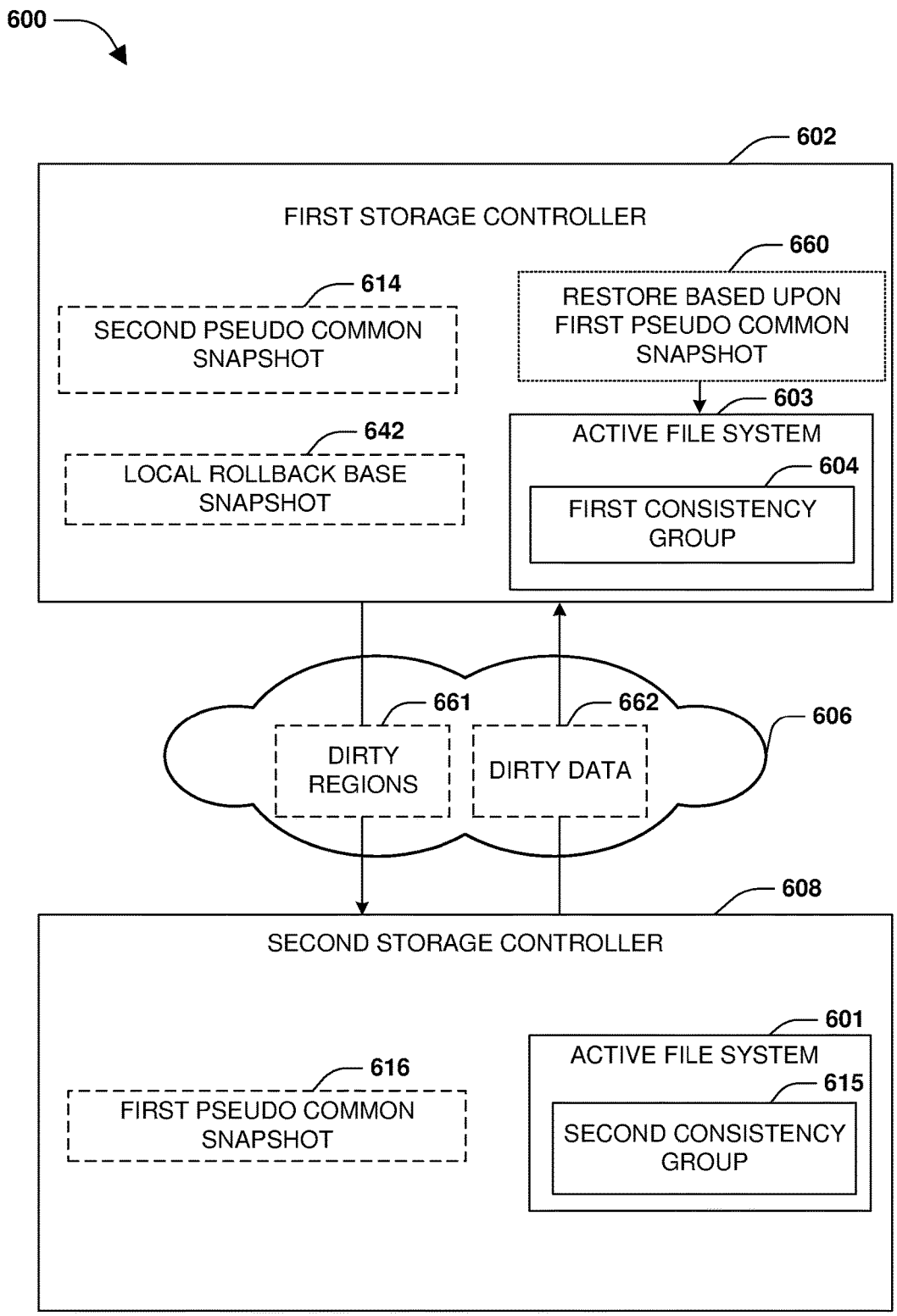
FIG. 6F is a component block diagram illustrating an exemplary computing device for resynchronization using pseudo common snapshots, where a first consistency group is restored.

FIG. 6D illustrates a local rollback base snapshot 642 of an active file system 603 of the first storage controller 602 being created. The local rollback base snapshot 642 may correspond to a point in time representation of the active file system 603, such as the first consistency group 604. FIG. 6E illustrates the active file system 603 being rolled back 650 based upon the second pseudo common snapshot 614. FIG. 6F illustrates the first consistency group 604 being restored 660 based upon the first pseudo common snapshot 616 until the first consistency group 604 mirrors the second consistency group 615 as reflected by the first pseudo common snapshot 616 (e.g., a data transfer of dirty data 662, within dirty regions 661 specified by the first storage controller 602 to the second storage controller 608, is performed by the second storage controller 608 to restore the first storage controller 602 back to the first pseudo common snapshot 616). For example, the first storage controller 602 is queried by the second storage controller 608 to identify data differences recorded within the intercept tracking log maintained by the first storage controller 602. The data differences are sent to the first storage controller 602 for overwriting corresponding portions within the first consistency group 604. In this way, dirty data 662, corresponding to the dirty regions 661, may be transferred from the second storage controller 608 to the first storage controller 602.

Figure 6G:
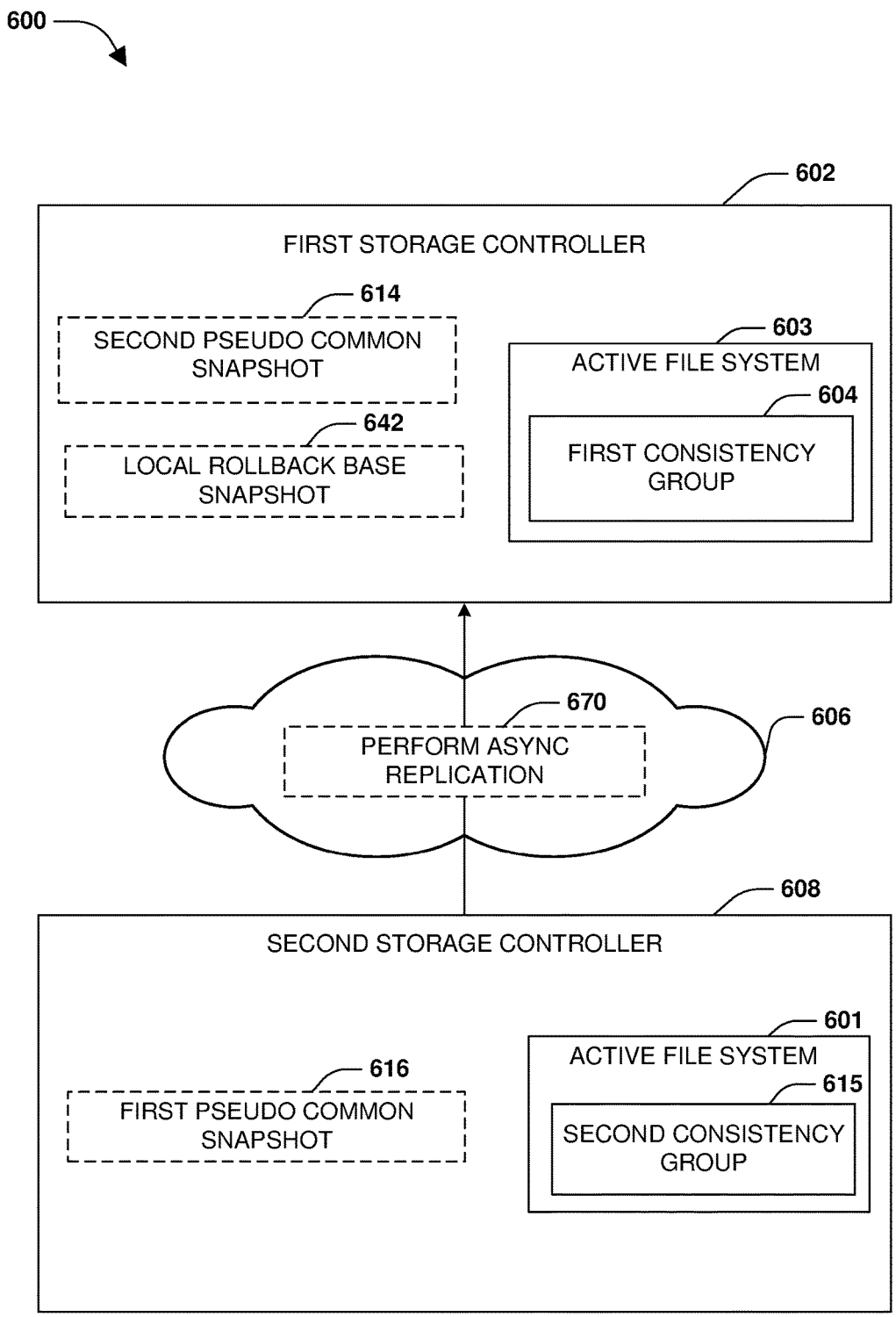
FIG. 6G is a component block diagram illustrating an exemplary computing device for resynchronization using pseudo common snapshots, where async replication is performed.

FIG. 6G illustrates an asynchronous replication 670 being performed to synchronize the first consistency group 604 with a current state of the second consistency group 615 (e.g., incremental snapshots of the second consistency group 615, such as of a volume and/or active file system hosting the second consistency group 615, may be used to perform incremental transfers to the first storage controller 602 for updating the first consistency group 604).

Figure 7:
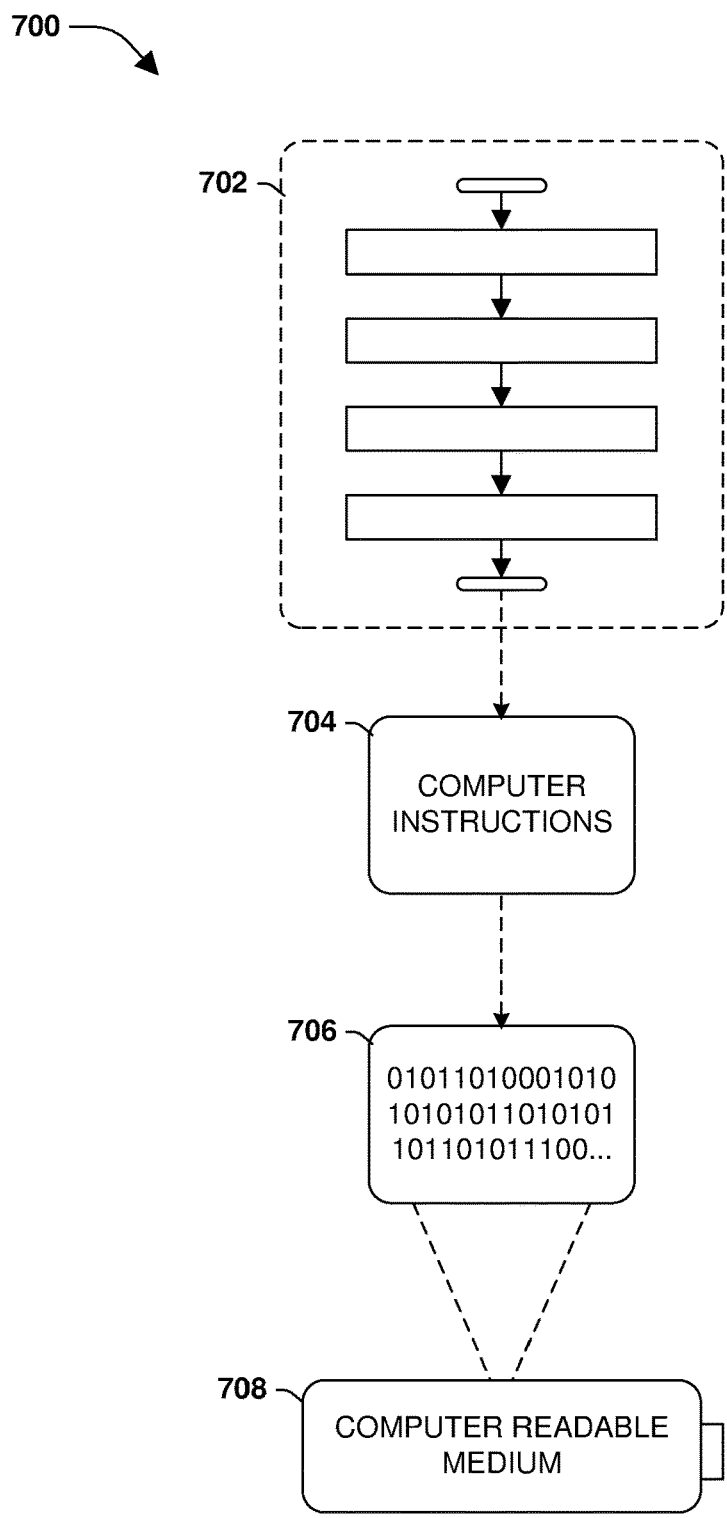
FIG. 7 is an example of a computer readable medium in accordance with one or more of the provisions set forth herein.

Still another embodiment involves a computer-readable medium comprising processor-executable instructions configured to implement one or more of the techniques presented herein. An example embodiment of a computer-readable medium or a computer-readable device that is devised in these ways is illustrated in FIG. 7, wherein the implementation 700 comprises a computer-readable medium 708, such as a CD-ft DVD-R, flash drive, a platter of a hard disk drive, etc., on which is encoded computer-readable data 706. This computer-readable data 706, such as binary data comprising at least one of a zero or a one, in turn comprises a processor-executable computer instructions 704 configured to operate according to one or more of the principles set forth herein. In some embodiments, the processor-executable computer instructions 704 are configured to perform a method 702, such as at least some of the exemplary method 300 of FIG. 3, for example. In some embodiments, the processor-executable computer instructions 704 are configured to implement a system, such as at least some of the exemplary system 400 of FIGS. 4A-4H, at least some of the exemplary system 500 of FIGS. 5A-5F, and/or at least some of the exemplary system 600 of FIGS. 6A-6G, for example. Many such computer-readable media are contemplated to operate in accordance with the techniques presented herein.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), EEPROM and/or flash memory, CD-ROMs, CD-Rs, CD-RWs, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method executed by a computing node, the method comprising:
    performing a first drain without hold operation to drain inflight write requests, targeting a first consistency group hosted by a first node having a synchronous replication relationship with a second consistency group hosted by a second node, occurring before a first point in time;
    logging incoming write requests to an intercept tracking log at the first point in time to indicate whether portions of the first consistency group have been modified with respect to the second consistency group;
    triggering creation of a first pseudo common snapshot of the second consistency group without pausing the incoming write requests; and
    creating a second pseudo common snapshot of the first consistency group without pausing the incoming write requests to capture the intercept tracking log indicative of data differences between the first consistency group and the second consistency group as reflected between the first pseudo common snapshot and the second pseudo common snapshot.

2. The method of claim 1, comprising:
stopping the logging of incoming write requests based upon creation of the first pseudo common snapshot and the second pseudo common snapshot.

3. The method of claim 1, wherein the lopping comprises:
locally implementing an incoming write request upon the first consistency group, wherein the incoming write request is logged into the intercept tracking log to indicate that the portion of the first consistency group has been modified.

4. The method of claim 1, comprising:
performing a second drain without hold operation to drain inflight write requests occurring before the creation of the first pseudo common snapshot.

5. The method of claim 3, wherein the incoming write request is replicated as a replicated write request transmitted to the second node, and wherein the method comprises:
instructing the second node to remotely implement the replicated write request upon a corresponding portion the second consistency group.

6. The method of claim 1, comprising:
modifying an active file system of the second node using differences between a local rollback base snapshot and the first pseudo common snapshot based upon the synchronous replication relationship transitioning to an out of sync state.

7. The method of claim 6, comprising:
applying the data differences, identified within the intercept tracking log captured within the second pseudo common snapshot, to the second consistency group until the second consistency group mirrors the first consistency group.

8. The method of claim 7, comprising:
performing a resynchronization between the first consistency group and the second consistency group using a common snapshot of the second consistency group after the data difference are applied and an incremental snapshot.

9. The method of claim 1, comprising:
modifying an active file system of the first node using the second pseudo common snapshot based upon the first node recovering from a failure.

10. The method of claim 9, comprising:
restoring the first consistency group based upon the first pseudo common snapshot until the first consistency group mirrors the second consistency group as reflected by the first pseudo common snapshot.

11. The method of claim 9, comprising:
performing a resynchronization between the first consistency group and the second consistency group using a common snapshot of the second consistency group after the first consistency group is restored.

12. The method of claim 1, wherein the intercept tracking log comprises a bitmap.

13. The method of claim 1, wherein the consistency group comprises a volume.

14. The method of claim 1, comprising:
utilizing a record, used to preserve a metadata operation received while logging to the intercept tracking log is enabled, during a resynchronization between the first consistency group and the second consistency group using the first pseudo common snapshot and the second pseudo common snapshot.

15. The method of claim 14, wherein the metadata operation corresponds to a set attribute command.

16. A non-transitory machine readable storage medium comprising machine executable code which when executed by a machine, causes the machine to:
perform a first drain without hold operation to drain inflight write requests, targeting a first consistency group hosted by a first node having a synchronous replication relationship with a second consistency group hosted by a second node, occurring before a first point in time;
log incoming write requests to an intercept tracking log at the first point in time to indicate whether portions of the first consistency group have been modified with respect to the second consistency group;
trigger creation of a first pseudo common snapshot of the second consistency group without pausing the incoming write requests; and
create a second pseudo common snapshot of the first consistency group without pausing the incoming write requests to capture the intercept tracking log indicative of data differences between the first consistency group and the second consistency group as reflected between the first pseudo common snapshot and the second pseudo common snapshot.

17. The non-transitory machine readable storage medium of claim 16, wherein the machine executable code causes the machine to:
locally implement an incoming write request upon the first consistency group, wherein the incoming write request is logged into the intercept tracking log to indicate that the portion of the first consistency group has been modified.

18. The non-transitory machine readable storage medium of claim 17, wherein the machine executable code causes the machine to:
perform a second drain without hold operation to drain inflight write requests occurring before the creation of the first pseudo common snapshot.

19. A computing device comprising:
a memory comprising machine executable code; and
a processor coupled to the memory, the processor configured to execute the machine executable code to cause the processor to:
perform a first drain without hold operation to drain inflight write requests, targeting a first consistency group hosted by a first node having a synchronous replication relationship with a second consistency group hosted by a second node, occurring before a first point in time;
log incoming write requests to an intercept tracking log at the first point in time to indicate whether portions of the first consistency group have been modified with respect to the second consistency group;
trigger creation of a first pseudo common snapshot of the second consistency group without pausing the incoming write requests; and
create a second pseudo common snapshot of the first consistency group without pausing the incoming write requests to capture the intercept tracking log indicative of data differences between the first consistency group and the second consistency group as reflected between the first pseudo common snapshot and the second pseudo common snapshot.

20. The computing device of claim 19, wherein the machine executable code causes the processor to:

perform a second drain without hold operation to drain inflight write requests occurring before the creation of the first pseudo common snapshot.

\* \* \* \* \*